United States Patent
Patel et al.

(10) Patent No.: US 11,472,436 B1
(45) Date of Patent: Oct. 18, 2022

(54) METHOD AND SYSTEM FOR OPERATING AN AUTONOMOUS AGENT WITH INCOMPLETE ENVIRONMENTAL INFORMATION

(71) Applicant: May Mobility, Inc., Ann Arbor, MI (US)

(72) Inventors: Sajan Patel, Ann Arbor, MI (US); Collin Johnson, Ann Arbor, MI (US); Gregory Meyer, Ann Arbor, MI (US); Edwin B. Olson, Ann Arbor, MI (US)

(73) Assignee: May Mobility, Inc, Ann Arbor, MI (US)

( * ) Notice: Subject to any disclaimer, the term of this patent is extended or adjusted under 35 U.S.C. 154(b) by 0 days.

(21) Appl. No.: 17/712,757

(22) Filed: Apr. 4, 2022

Related U.S. Application Data

(60) Provisional application No. 63/170,206, filed on Apr. 2, 2021.

(51) Int. Cl.
*B60W 60/00* (2020.01)
*G01S 17/89* (2020.01)
(Continued)

(52) U.S. Cl.
CPC ........ *B60W 60/0011* (2020.02); *B60W 40/04* (2013.01); *B60W 60/0015* (2020.02);
(Continued)

(58) Field of Classification Search
CPC ......... B60W 60/0011; B60W 60/0015; B60W 60/00; B60W 40/04; G01S 17/931; G01S 17/89
See application file for complete search history.

(56) References Cited

U.S. PATENT DOCUMENTS

| 5,544,282 A | 8/1996 | Chen et al. |
| 6,199,013 B1 | 3/2001 | Oshea |

(Continued)

FOREIGN PATENT DOCUMENTS

| JP | 2011100492 A | 5/2011 |
| JP | 2015083417 A | 4/2015 |

(Continued)

OTHER PUBLICATIONS

Cunningham, A., et al., "MPDM: Multipolicy Decision-Making in Dynamic, Uncertain Environments for Autonomous Driving", Proceedings of the IEEE International Conference on Robotics and Automation (ICRA) (2015).

(Continued)

*Primary Examiner* — Tan Q Nguyen
(74) *Attorney, Agent, or Firm* — Jeffrey Schox; Caitlin Ploch

(57) ABSTRACT

A system for operating an autonomous agent with incomplete environmental information can include and/or interface an autonomous operating system and an autonomous agent. A method for operating an autonomous agent with incomplete environmental information includes any or all of: receiving a set of inputs; determining a set of known objects in the ego vehicle's environment; determining a set of blind regions in the ego vehicle's environment; and inserting a set of virtual objects into the set of blind regions; selecting a set of virtual objects based on the set of blind regions; operating the autonomous agent based on the set of virtual objects; and/or any other suitable processes.

20 Claims, 14 Drawing Sheets

(51) Int. Cl.
*B60W 40/04* (2006.01)
*G01S 17/931* (2020.01)

(52) U.S. Cl.
CPC ............ *G01S 17/89* (2013.01); *G01S 17/931* (2020.01); *B60W 2420/52* (2013.01); *B60W 2554/404* (2020.02); *B60W 2556/10* (2020.02)

(56) References Cited

U.S. PATENT DOCUMENTS

| | | | |
|---|---|---|---|
| 9,129,519 | B2 | 9/2015 | Aoude et al. |
| 9,274,525 | B1 | 3/2016 | Ferguson et al. |
| 9,495,874 | B1 | 11/2016 | Zhu et al. |
| 9,618,938 | B2 | 4/2017 | Olson et al. |
| 9,646,428 | B1 | 5/2017 | Konrardy et al. |
| 9,720,412 | B1 | 8/2017 | Zhu et al. |
| 9,811,760 | B2 | 11/2017 | Richardson et al. |
| 10,012,981 | B2 | 7/2018 | Gariepy et al. |
| 10,235,882 | B1 | 3/2019 | Aoude et al. |
| 10,248,120 | B1 | 4/2019 | Siegel et al. |
| 10,386,856 | B2 | 8/2019 | Wood et al. |
| 10,540,892 | B1 | 1/2020 | Fields et al. |
| 10,558,224 | B1 | 2/2020 | Lin et al. |
| 10,586,254 | B2 | 3/2020 | Singhal |
| 10,642,276 | B2 | 5/2020 | Huai |
| 10,969,470 | B2 | 4/2021 | Voorheis et al. |
| 2002/0062207 | A1 | 5/2002 | Faghri |
| 2004/0100563 | A1 | 5/2004 | Sablak et al. |
| 2005/0004723 | A1 | 1/2005 | Duggan et al. |
| 2006/0184275 | A1 | 8/2006 | Hosokawa et al. |
| 2006/0200333 | A1 | 9/2006 | Dalal et al. |
| 2007/0193798 | A1 | 8/2007 | Allard et al. |
| 2007/0276600 | A1 | 11/2007 | King et al. |
| 2008/0033684 | A1 | 2/2008 | Vian et al. |
| 2010/0114554 | A1 | 5/2010 | Misra |
| 2010/0204867 | A1 | 8/2010 | Longstaff |
| 2011/0142283 | A1 | 6/2011 | Huang et al. |
| 2012/0089275 | A1 | 4/2012 | Yao-Chang et al. |
| 2013/0141576 | A1 | 6/2013 | Lord et al. |
| 2013/0253816 | A1 | 9/2013 | Caminiti et al. |
| 2014/0195138 | A1 | 7/2014 | Stelzig et al. |
| 2014/0244198 | A1 | 8/2014 | Mayer |
| 2014/0309815 | A1 | 10/2014 | Ricci et al. |
| 2015/0284010 | A1* | 10/2015 | Beardsley ............ G05D 1/0289 701/1 |
| 2015/0302756 | A1 | 10/2015 | Guehring et al. |
| 2015/0316928 | A1 | 11/2015 | Guehring et al. |
| 2015/0321337 | A1 | 11/2015 | Stephens |
| 2016/0005333 | A1 | 1/2016 | Naouri |
| 2016/0209840 | A1 | 7/2016 | Kim |
| 2016/0314224 | A1 | 10/2016 | Wei et al. |
| 2017/0031361 | A1 | 2/2017 | Olson et al. |
| 2017/0032671 | A1 | 2/2017 | Toyama et al. |
| 2017/0072853 | A1 | 3/2017 | Matsuoka et al. |
| 2017/0155696 | A1 | 6/2017 | Dong et al. |
| 2017/0199523 | A1 | 7/2017 | Barton-Sweeney et al. |
| 2017/0268896 | A1 | 9/2017 | Bai et al. |
| 2017/0289341 | A1 | 10/2017 | Rodriguez et al. |
| 2017/0291560 | A1 | 10/2017 | Schroeder et al. |
| 2017/0301111 | A1 | 10/2017 | Zhao et al. |
| 2017/0323568 | A1 | 11/2017 | Inoue et al. |
| 2017/0356748 | A1 | 12/2017 | Iagnemma |
| 2018/0011485 | A1 | 1/2018 | Ferren |
| 2018/0046182 | A1 | 2/2018 | Joyce et al. |
| 2018/0047291 | A1 | 2/2018 | Konishi et al. |
| 2018/0053102 | A1 | 2/2018 | Martinson et al. |
| 2018/0070056 | A1 | 3/2018 | Deangelis et al. |
| 2018/0082596 | A1 | 3/2018 | Whitlow |
| 2018/0089563 | A1 | 3/2018 | Redding et al. |
| 2018/0183873 | A1 | 6/2018 | Wang et al. |
| 2018/0184352 | A1 | 6/2018 | Lopes et al. |
| 2018/0220283 | A1 | 8/2018 | Condeixa et al. |
| 2018/0224851 | A1 | 8/2018 | Park |
| 2018/0251126 | A1 | 9/2018 | Linscott et al. |
| 2018/0268281 | A1 | 9/2018 | Olson et al. |
| 2018/0293537 | A1 | 10/2018 | Kwok |
| 2018/0330481 | A1 | 11/2018 | Watanabe et al. |
| 2018/0365908 | A1 | 12/2018 | Liu et al. |
| 2018/0367997 | A1 | 12/2018 | Shaw et al. |
| 2019/0027034 | A1 | 1/2019 | Xu et al. |
| 2019/0039545 | A1 | 2/2019 | Kumar et al. |
| 2019/0066399 | A1 | 2/2019 | Jiang et al. |
| 2019/0106117 | A1 | 4/2019 | Goldberg |
| 2019/0113919 | A1 | 4/2019 | Englard et al. |
| 2019/0138524 | A1 | 5/2019 | Singh et al. |
| 2019/0147610 | A1 | 5/2019 | Frossard et al. |
| 2019/0180529 | A1 | 6/2019 | Smith |
| 2019/0196465 | A1 | 6/2019 | Hummelshøj |
| 2019/0220011 | A1 | 7/2019 | Della Penna |
| 2019/0227553 | A1 | 7/2019 | Kentley-Klay et al. |
| 2019/0236950 | A1 | 8/2019 | Li et al. |
| 2019/0258246 | A1 | 8/2019 | Liu et al. |
| 2019/0265059 | A1 | 8/2019 | Warnick et al. |
| 2019/0271554 | A1 | 9/2019 | Colgate et al. |
| 2019/0271981 | A1 | 9/2019 | Oba |
| 2019/0331758 | A1 | 10/2019 | Malkes et al. |
| 2019/0337509 | A1 | 11/2019 | Shalev-Shwartz et al. |
| 2020/0004241 | A1 | 1/2020 | Levinson et al. |
| 2020/0020226 | A1 | 1/2020 | Stenneth et al. |
| 2020/0094850 | A1 | 3/2020 | Chi et al. |
| 2020/0098269 | A1 | 3/2020 | Wray et al. |
| 2020/0122830 | A1 | 4/2020 | Anderson et al. |
| 2020/0124447 | A1 | 4/2020 | Schwindt et al. |
| 2020/0159227 | A1 | 5/2020 | Cohen et al. |
| 2020/0189731 | A1 | 6/2020 | Mistry et al. |
| 2020/0233060 | A1 | 7/2020 | Lull et al. |
| 2020/0255027 | A1 | 8/2020 | Kulkarni et al. |
| 2020/0294401 | A1* | 9/2020 | Kerecsen ............ G05D 1/0287 |
| 2020/0346666 | A1 | 11/2020 | Wray et al. |
| 2020/0355820 | A1 | 11/2020 | Zeng et al. |
| 2020/0369294 | A1 | 11/2020 | Jeon et al. |
| 2020/0400781 | A1 | 12/2020 | Voorheis et al. |
| 2021/0042535 | A1* | 2/2021 | Abbott ...................... G06T 7/70 |
| 2021/0116907 | A1 | 4/2021 | Altman |
| 2021/0181758 | A1 | 6/2021 | Das et al. |
| 2021/0197864 | A1 | 7/2021 | Oltmann et al. |
| 2021/0269063 | A1 | 9/2021 | Lee et al. |
| 2022/0076032 | A1* | 3/2022 | Jain ........................ G06V 20/58 |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect of Pruning on a Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

\* cited by examiner

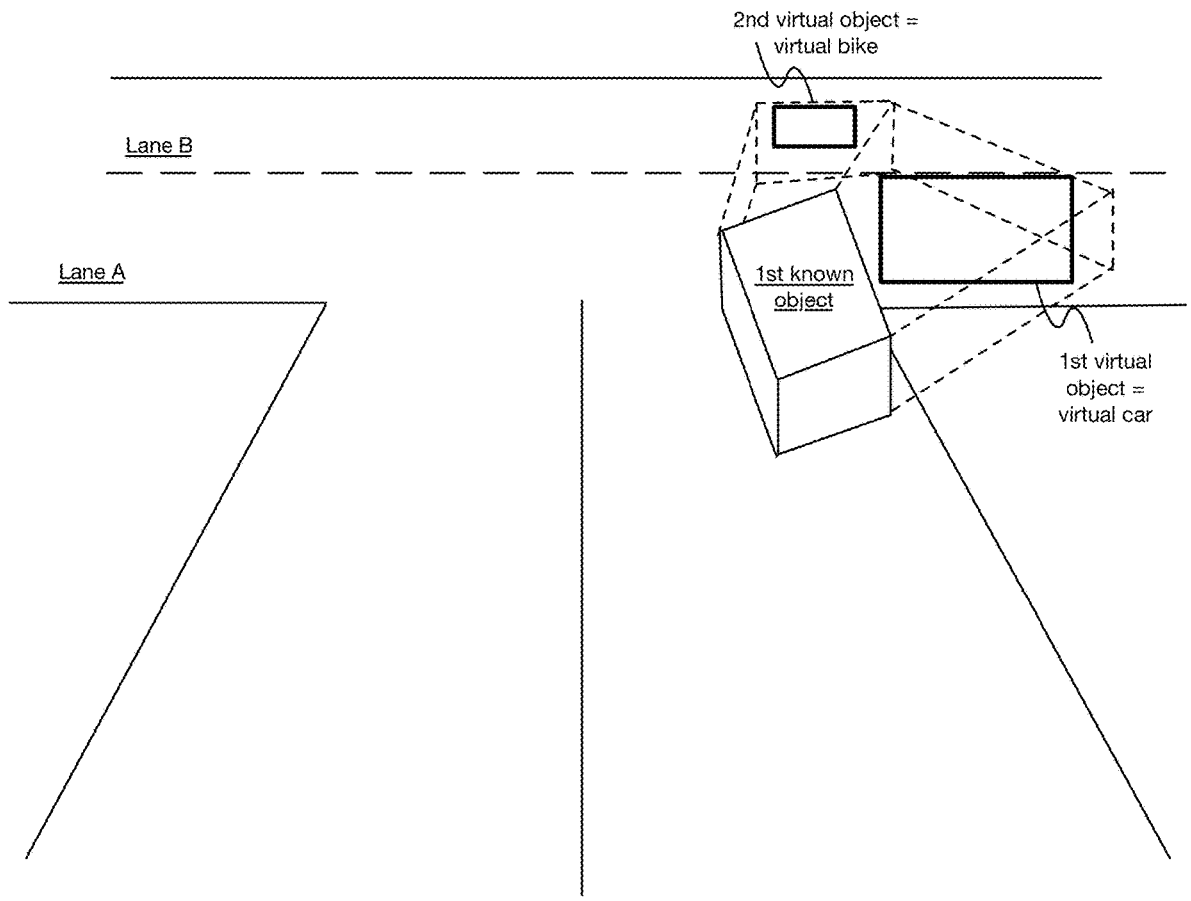

Analysis for 1st blind region:

Blind region is within a conflict zone --> Trigger further analysis

Detect that conflict zone has 2 lanes of 1-way traffic --> consider placing a virtual object in each Blind region is large enough to fit any of: a virtual car, a virtual bicycle, and a virtual pedestrian The largest virtual object that can fit in Lane A of 1st blind region is a virtual car The largest virtual object that can fit in Lane B of 1st blind region is a virtual bike Insert a virtual car into Lane A of the 1st blind region Optionally place in most dangerous location (e.g., based on anticipated location of ego vehicle at a later time, at a nearest edge to the ego vehicle, etc.)

Insert a virtual bike into Lane B of the 1st blind region

Optionally place in most dangerous location (e.g., based on anticipated location of ego vehicle at a later time, at a nearest edge to the ego vehicle, etc.)

FIGURE 9B

Analysis for 2nd blind region:

Blind region is not within a conflict zone --> Stop analysis

Analysis for 3rd blind region:

Blind region is within a conflict zone --> Trigger further analysis

Detect that conflict zone has 2 lanes of 1-way traffic and that 3rd blind region is in the direction in which no objects would emerge heading toward the vehicle --> Stop analysis

METHOD AND SYSTEM FOR OPERATING AN AUTONOMOUS AGENT WITH INCOMPLETE ENVIRONMENTAL INFORMATION

CROSS-REFERENCE TO RELATED APPLICATIONS

This application claims the benefit of U.S. Provisional Application No. 63/170,206, filed 2 Apr. 2021, which is incorporated in its entirety by this reference.

TECHNICAL FIELD

This invention relates generally to the autonomous vehicle field, and more specifically to a new and useful system and method for operating an autonomous vehicle in regions of reduced or absent data in the autonomous vehicle field.

BACKGROUND

In the autonomous vehicle field, it is crucial for the autonomous agent to have an accurate and complete understanding of its environment, in order to safely proceed through its dynamically changing surroundings. However, the sensors of autonomous vehicles are often obstructed or otherwise unable to detect certain regions surrounding the agent, resulting in "blind spots" which can cause a high-level uncertainty in the agent's understanding of its environment. Conventional systems and methods typically account for this by prescribing overly cautious behavior for the agent in these scenarios, such as coming to a stop or proceeding very slowly. Not only is this behavior inefficient (e.g., slow, overly cautious, requiring the vehicle to come to a stop, etc.) and often frustrating to surrounding drivers, it can also be dangerous in an event that the agent acts in an unexpected way to other drivers, such as coming to a stop in an intersection. Further, maintaining a set of programmed rules and/or behaviors in response to explicitly detecting these blind spots is difficult and often computationally expensive.

Thus, there is a need in the autonomous vehicle field to create an improved and useful system and method for operating an autonomous agent with an incomplete understanding of its environment.

BRIEF DESCRIPTION OF THE FIGURES

FIGS. 9A-9E depict an example implementation of a method for operating an autonomous agent.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
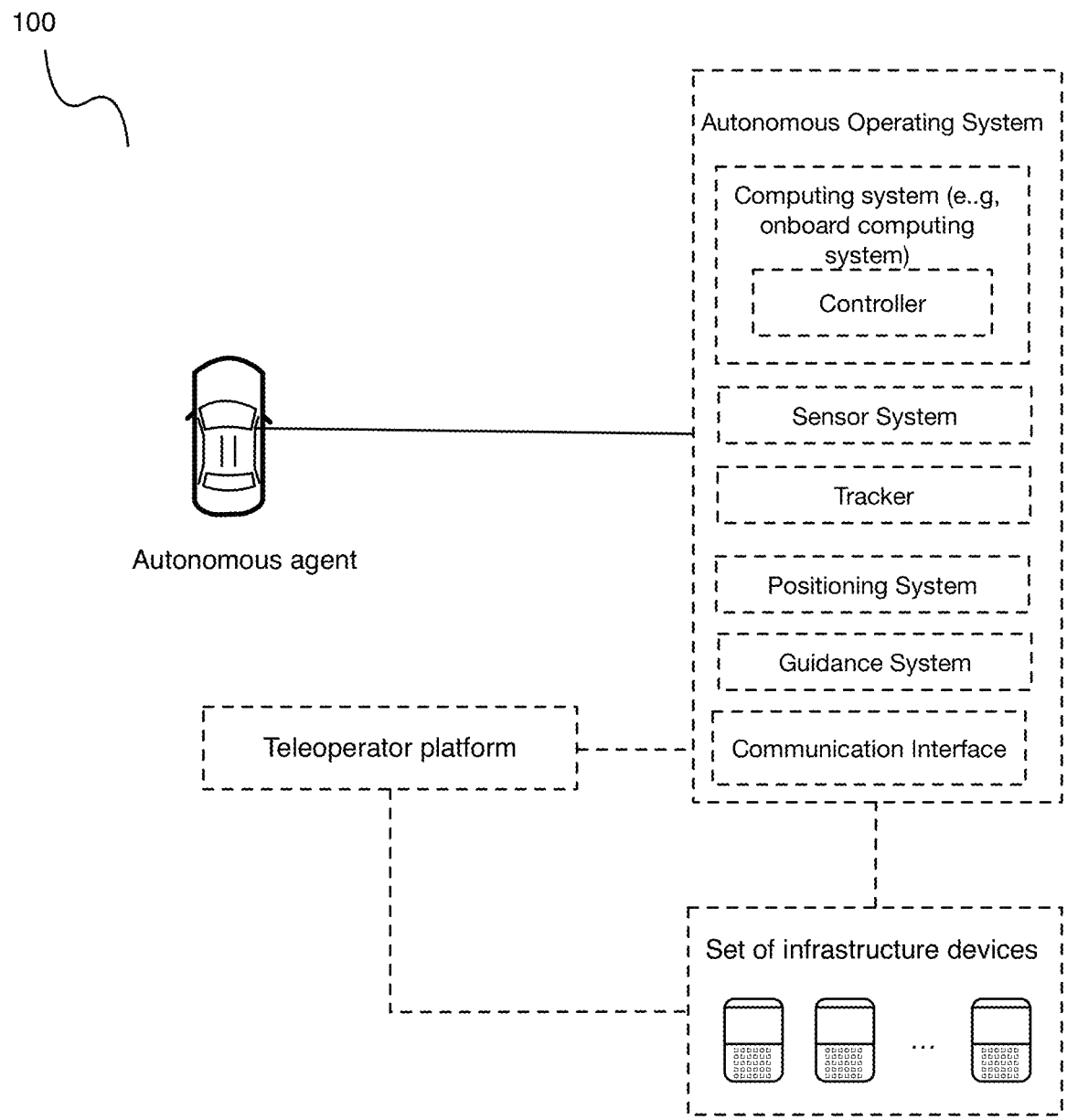
FIG. 1 is a schematic of a system for operating an autonomous agent.

As shown in FIG. 1, a system 100 for operating an autonomous agent with incomplete environmental information can include and/or interface an autonomous operating system and an autonomous agent. Additionally or alternatively, the system can include or all of the components as described in U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; and U.S. application Ser. No. 17/554,619, filed 17 Dec. 2021; each of which is incorporated herein in its entirety by this reference.

The system 100 is preferably used to perform any or all of the method 200 described below, but can additionally or alternatively be used to perform any other suitable method(s).

Figure 2:
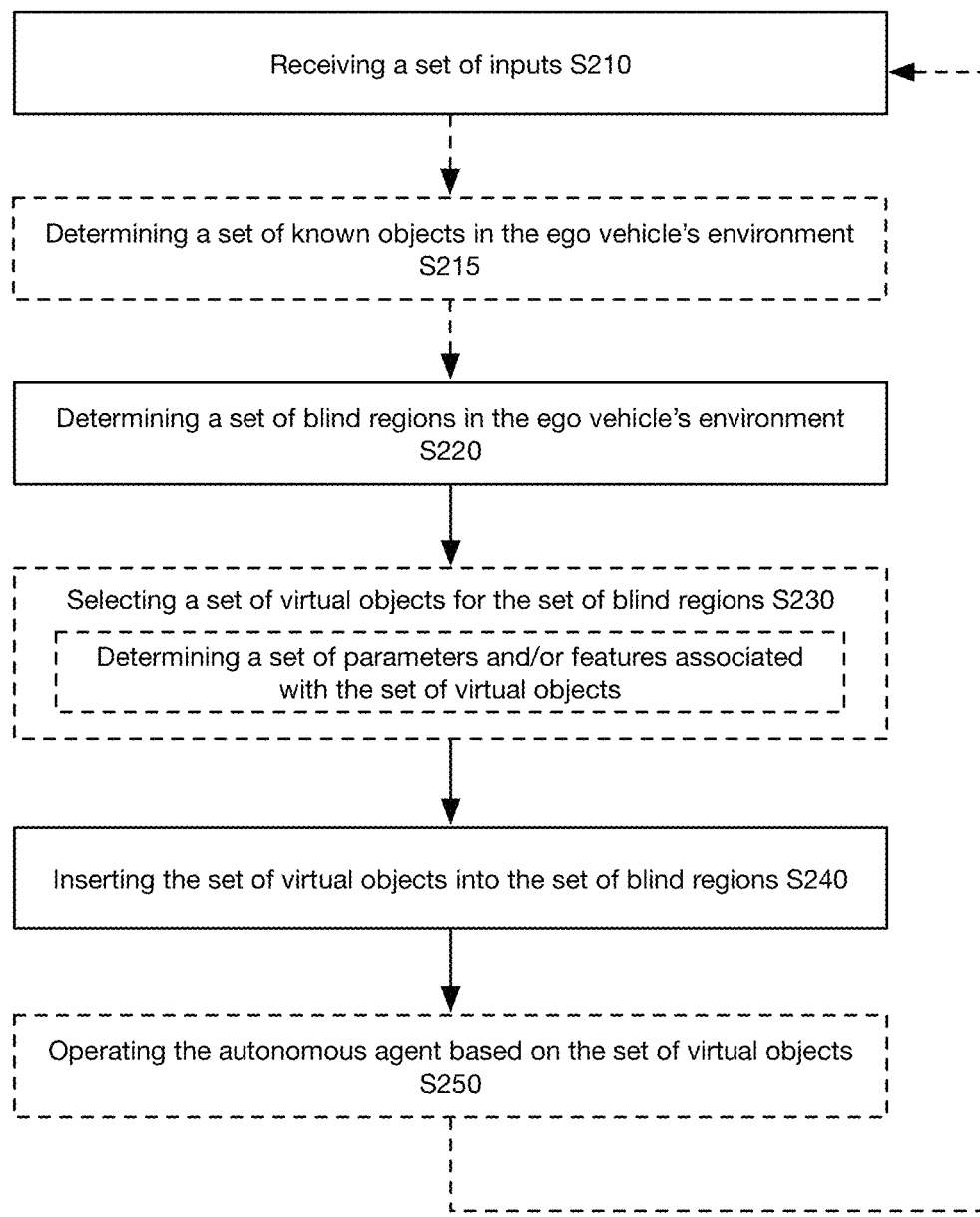
FIG. 2 is a schematic of a method for operating an autonomous agent.

As shown in FIG. 2, a method 200 for operating an autonomous agent with incomplete environmental information includes any or all of: receiving a set of inputs S210; determining a set of blind regions in the ego vehicle's environment S220; and inserting a set of virtual objects into the set of blind regions S240; and; and/or any other suitable processes. Additionally or alternatively, the method 200 can include any or all of: determining a set of known objects in the ego vehicle's environment S215; selecting a set of virtual objects based on the set of blind regions S230; operating the autonomous agent based on the set of virtual objects S250; and/or any other suitable processes. Further additionally or alternatively, the method 200 can include and/or interface with any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; and U.S. application Ser. No. 17/554,619, filed 17 Dec. 2021; each of which is incorporated herein in its entirety by this reference, or any other suitable processes performed in any suitable order.

The method 200 can be performed with a system as described above and/or any other suitable system.

2. Benefits

The system and method for operating an autonomous agent with incomplete environmental information can confer several benefits over current systems and methods.

In a first variation, the technology confers the benefit of enabling an autonomous agent to operate with incomplete environmental information without requiring the autonomous agent to drive overly cautious manner, in an unnatural manner, in a dangerous manner, and/or otherwise less optimally, which can be bothersome, disruptive, and potentially dangerous to other vehicles, drivers, and pedestrians in the autonomous agent's environment. In examples, the system and/or method enables the ego vehicle to drive in an optimal way through the inclusion of virtual objects (equivalently referred to herein as phantom objects/agents, hypothetical objects/agents, ghost objects/agents, etc.) in planning or trajectory generation of the autonomous agent. In specific examples, the autonomous agent operates as if these virtual objects were real.

Additionally, the technology can confer the benefit of optimizing the response of the ego vehicle to an incomplete environmental representation by selecting parameters for the virtual objects which are reasonable for the virtual objects to have (e.g., based on physics/dynamics principles, historical information, a situational awareness/understanding of how known objects in the ego vehicle's environment are behaving, statistics and/or probabilities, etc.) rather than, for instance, selecting all predetermined and/or most dangerous parameters for each virtual object, which can result in the ego vehicle being stopped (e.g., "getting stuck," not progressing toward a goal, not moving, etc.), driving in dangerous and/or confusing ways to other drivers (e.g., slamming on the brakes despite there not being an object present), and/or otherwise driving in non-optimal ways.

Additionally or alternatively, the technology can enable and/or encourage the ego vehicle to operate in ways which helps the ego vehicle collect (e.g., with its sensors) more information about its environment (e.g., determine whether or not an object is actually present in a blind region), and thereby enable the ego vehicle to operate in efficient, safe, and/or otherwise optimal ways (e.g., not being stopped for long periods of time). In specific examples, for instance, a policy (e.g., behavior) can be proposed to and/or implemented at the ego vehicle (e.g., a creep forward behavior) which is configured to help the ego vehicle collect additional information about its environment, such as one or more particular blind regions in the ego vehicle's environment.

In a second variation, additional or alternative to the first, the technology confers the benefit of not requiring the creation and/or use and/or maintenance of a library of hard-coded logic (e.g., at a planner/planning module of the ego vehicle) for detecting and responding to various different blind spots which the autonomous agent may encounter. In specific examples, the system and/or method enables this through the inclusion of virtual objects in planning or trajectory generation of the autonomous agent, such that the autonomous agent reacts to the virtual objects as it would to real objects in its environment.

In a third variation, additional or alternative to those described above, the technology confers the benefit of enabling and/or optimizing for computational efficiency in selecting the virtual objects to be considered by the agent, while still ensuring that the agent drives in a safe manner. In specific examples, for instance, this is enabled through any or all of: inserting virtual objects which represent a worst-case, yet possible (e.g., realistic) scenario; using information about known agents (e.g., historical information about their presence, speed, location, etc.) as priors (e.g., initial beliefs, probability distributions for a Bayesian inference process in a multi-policy-decision-making process, etc.) into/regarding regions of invisibility (equivalently referred to herein as blind regions); using a duration of invisibility for a region to determine the likelihood of an agent being present at a normal speed (e.g., speed of traffic); using a duration of invisibility for a region to determine the maximum speed of an object which might be present within the region; only inserting virtual objects into predetermined zones (e.g., regions which have a likelihood and/or high likelihood of conflict) and/or refraining from adding virtual objects into predetermined zones based on supplementary information (e.g., a proposed policy for the ego vehicle, the behavior of other vehicles, etc.); referencing a predetermined (e.g., pre-labeled) map to determine any or all of the predetermined zones (e.g., as opposed to dynamically characterizing these zones); only simulating a subset of potential (e.g., only worst-case, only relevant, etc.) behaviors and/or policies for the virtual objects; and/or enabled in any other suitable way(s).

Additionally or alternatively, the system and method can confer any other benefit(s).

3. System 100

As shown in FIG. 1, a system 100 for operating an autonomous agent with incomplete environmental information can include and/or interface an autonomous operating system and an autonomous agent. Additionally or alternatively, the system can include or all of the components as described in U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; and U.S. application Ser. No. 17/554,619, filed 17 Dec. 2021; each of which is incorporated herein in its entirety by this reference.

The system 100 functions to autonomously or partially autonomously operate an ego vehicle in numerous environments, including those in which the ego vehicle does not have a full understanding of its environment. Additionally or alternatively, the system 100 can function to improve the operation of the ego vehicle in uncertain environments, such as through preventing the ego vehicle from being stopped or stalled for long periods of time in uncertain environments; preventing the ego vehicle from operating in ways which are confusing and/or disruptive to other users of the road; enabling the ego vehicle to make progress toward a goal; and/or otherwise improving operation of the ego vehicle. Further additionally or alternatively, the system 100 can function to: enable the ego vehicle to navigate a set of routes, wherein the set of routes can be any or all of: fixed, dynamically determined, or any combination; maintain and/or increase a computational efficiency associated with operation of the ego vehicle; and/or can perform any other suitable functions.

3.1 System—Components

The system 100 preferably includes and/or interfaces with (e.g., is integrated within) an autonomous vehicle (equivalently referred to herein as an ego vehicle, autonomous agent, agent, and/or ego agent). The autonomous agent preferably includes an autonomous vehicle, further preferably a fully autonomous vehicle and/or a vehicle able to be operated as a fully autonomous vehicle, but can additionally or alternatively be a semi-autonomous vehicle and/or any other vehicle.

Additionally, or alternatively, the autonomous agent can be a vehicle that switches between a semi-autonomous state and a fully autonomous state (or a fully-manned state) and thus, the autonomous agent can have attributes of both a semi-autonomous vehicle and a fully autonomous vehicle depending on the state of the autonomous agent.

In preferred variations, the autonomous vehicle is an automobile (e.g., car, driverless car, bus, shuttle, taxi, ride-share vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The autonomous agent preferably includes and/or interfaces with a computing and/or processing system, wherein the computing and/or processing system functions to process information (e.g., sensor inputs) in order to determine a set of one or more trajectories for the vehicle. Additionally or alternatively, the computing and/or processing system can function to perform any or all of the processes involved in any or all of: perception, prediction, localization, planning, and/or any other processes involved in operation of the autonomous agent.

The computing system preferably includes an onboard computing system arranged onboard (e.g., integrated within) the autonomous agent. Additionally or alternatively, the computing system can include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, and/or any other suitable computing systems and devices. In some variations, for instance, the autonomous agent is operable in communication with a remote or disparate computing system that may include a user device (e.g., a mobile phone, a laptop, etc.), a remote server, a cloud server, or any other suitable local and/or distributed computing system remote from the vehicle. The remote computing system can be connected to one or more systems of the autonomous agent through one or more data connections (e.g., channels), but can alternatively communicate with the vehicle system in any suitable manner.

The computing system preferably includes a processing system (e.g., graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory.

In some variations, for instance, the onboard computing system operates to interact with and/or operably control any or one or more of the identified components or modules described herein. In preferred variations, for instance, the onboard computing system implements and/or executes computer instructions for implementing a multi-policy decisioning module (e.g., as described below). In specific examples, the processing system and memory collectively function to dynamically manage the set of policies available to the autonomous agent in the framework of a multi-policy decision making framework, such as that described in U.S. application Ser. No. 16/514,624, filed 17 Jul. 2019, and/or U.S. application Ser. No. 17/365,538, filed 1 Jul. 2021, each of which is incorporated herein in its entirety by this reference. Additionally or alternatively, the processing system and memory, and/or any other suitable components, can be used for any other suitable functions.

In specific examples, the multi-policy decision-making module includes a simulator module or similar machine or system that functions to estimate future (i.e., steps forward in time) behavioral policies (operations or actions) for each of the agents and/or objects (e.g., pedestrians) identified in an operating environment of the autonomous agent (real or virtual) including potential behavioral policies that may be executed by the autonomous agent, as described in U.S. patent application Ser. No. 14/814,766, which is incorporated in its entirety by this reference. The simulations may be based on a current state of each agent (e.g., the current hypotheses) and historical actions or historical behaviors of each of the agents derived from the historical data buffer (preferably including data up to a present moment). The simulations may provide data relating to interactions (e.g., relative positions, relative velocities, relative accelerations, etc.) between projected behavioral policies of each agent and the one or more potential behavioral policies that may be executed by the autonomous agent.

The computing system (e.g., onboard computing system) preferably functions to control the autonomous agent and process sensed data from a sensor system (equivalently referred to herein as a sensor suite) (e.g., a computer vision system, LIDAR, flash LIDAR, wheel speed sensors, GPS, etc.) of the autonomous agent and/or other sensors (e.g., from infrastructure devices) to determine states of the autonomous agent and/or states of objects (e.g., other vehicles/agents, pedestrians, cyclists, etc.) in an operating environment of the autonomous agent. Based on the states of the autonomous agent and/or objects (e.g., real objects, virtual objects, etc.) in the operating environment and/or any other information/instructions (e.g., programmed instructions, learned instructions, etc.), the onboard computing system—such as through a multi-policy decision-making module—can generate behavioral policies and select a behavioral policy (e.g., change lanes, merge, maintain current lane, turn left, turn right, pull over, slow down, speed up, stop at light, stop at stop sign, yield, etc.) that the computing system executes to control a behavior of the autonomous agent.

In a first set of variations, the computing system includes an onboard general-purpose computer adapted for I/O communication with vehicle control systems and sensor systems but may additionally or alternatively be any suitable computing device. The onboard computing system is preferably connected to the Internet via a wireless connection (e.g., via a cellular link or connection). Additionally, or alternatively, the onboard computing system can be coupled to any number of wireless or wired communication systems.

Additionally or alternatively, any other computing system(s) can be used.

The system 100 preferably includes a communication interface in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

Figure 5:
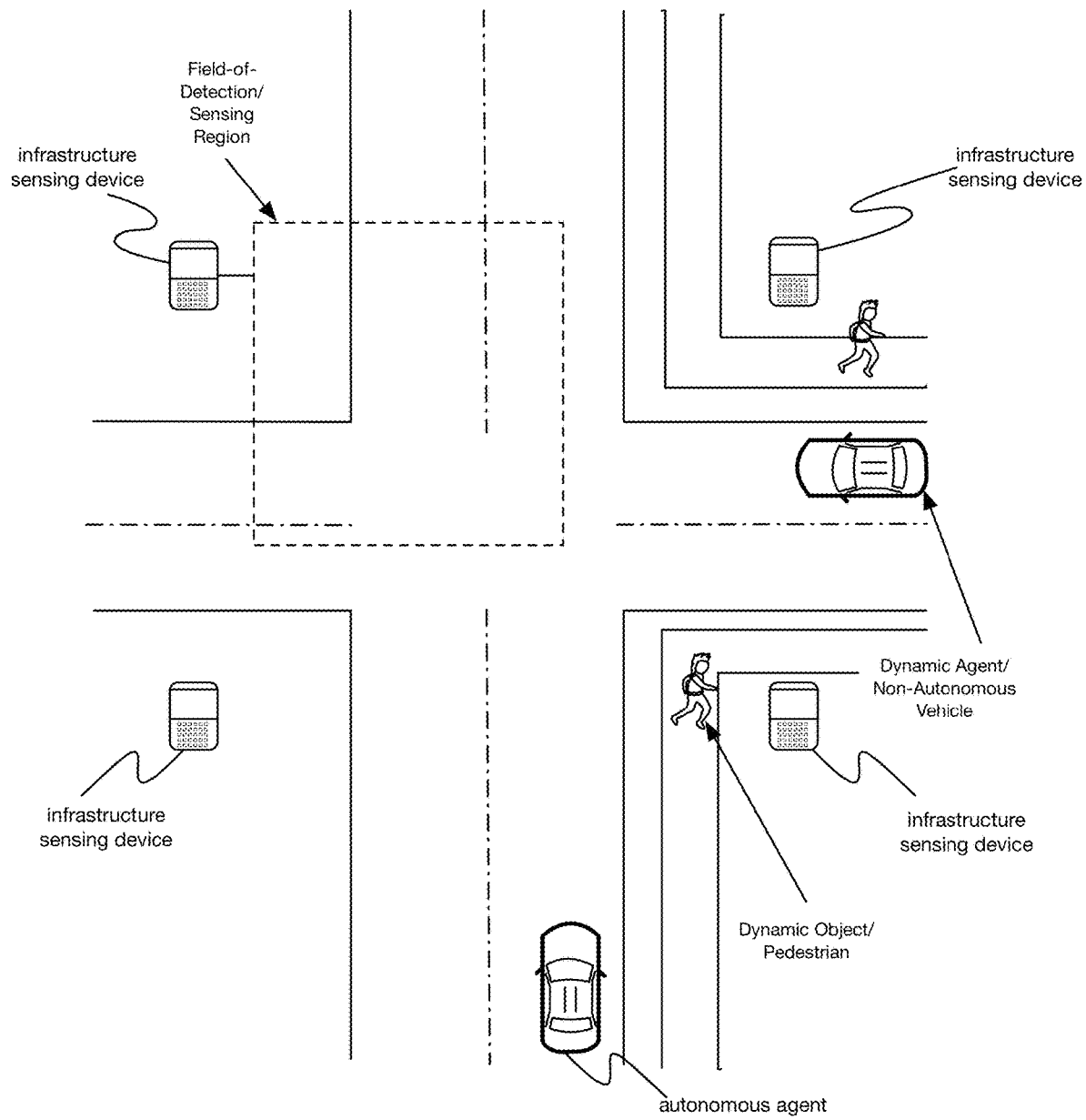
FIG. 5 depicts a schematic variation of an autonomous agent in its environment.

The system 100 can optionally include a set of infrastructure devices (e.g., as shown in FIG. 5), equivalently referred to herein as roadside units, which individually and/or collectively function to observe one or more aspects and/or features of an environment and collect observation data relating to the one or more aspects and/or features of the environment (e.g., gain an additional vantage point of the environment). In preferred variations, the infrastructure devices additionally function to collect data associated with the observations and transmit the collected data and/or processed derivatives of the collected data to the autonomous agent. Additionally or alternatively, the infrastructure devices can function to collect and transmit data to a teleoperator platform, wherein the teleoperators can use the data to inform decision making of a teleoperator, such as whether to include and/or exclude a behavioral policy from consideration by the computing system of the autonomous agent. In a specific example, for instance, an infrastructure device can enable a view around a corner of the vehicle to be seen, which the agent and/or an operator and/or a teleoperator of the agent can use to enable a turning behavioral policy to be considered by the autonomous agent (by seeing that the road is clear for a turn).

Alternatively, the system can be implemented in absence of infrastructure devices.

The system preferably includes and/or interfaces with a sensor suite (e.g., computer vision system, LiDAR, RADAR, wheel speed sensors, GPS, cameras, etc.), wherein the sensor suite (equivalently referred to herein as a sensor system) is in communication with the onboard computing system and functions to collect information with which to determine one or more trajectories for the autonomous agent. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite preferably includes sensors onboard the autonomous vehicle (e.g., RADAR sensors and/or LiDAR sensors and/or cameras coupled to an exterior surface of the agent, IMUs and/or encoders coupled to and/or arranged within the agent, etc.), but can additionally or alternatively include sensors remote from the agent (e.g., as part of one or more infrastructure devices, sensors in communication with the agent, etc.), and/or any suitable sensors at any suitable locations.

The system can optionally include and/or interface with a vehicle control system including one or more controllers and/or control systems, which include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

Additionally or alternatively, the vehicle control system can include, interface with, and/or communication with any or all of a set electronic modules of the agent, such as but not limited to, any or all of: electronic control units [ECUs], telematic control units [TCUs], transmission control modules [TCMs], antilock braking system [ABS] control module, body control module [BCM], and/or any other suitable control subsystems and/or modules.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system can include any or all of: a sensor fusion system, a positioning system (e.g., including location sensors of the sensor system), a guidance system, and/or any suitable components. In some variations, for instance, the sensor fusion system synthesizes and processes sensor data and together with a multi-policy decisioning module predicts the presence, location, classification, and/or path of objects and features of the environment of the autonomous agent (real or virtual). In various embodiments, the sensor fusion system may function to incorporate data from multiple sensors and/or data sources, including but not limited to cameras, LiDARS, radars, infrastructure devices, remote data feeds (Internet-based data feeds), and/or any number of other types of sensors.

The positioning system can process sensor data along with other data to determine a position (e.g., a local position relative to a map, an exact position relative to lane of a road, vehicle heading, velocity, etc.) of the autonomous agent relative to the environment, which can function to determine what behavioral policies are available to the autonomous agent (e.g., as described below). The guidance system can process sensor data along with other data to determine a path for the vehicle to follow.

Figure 8:
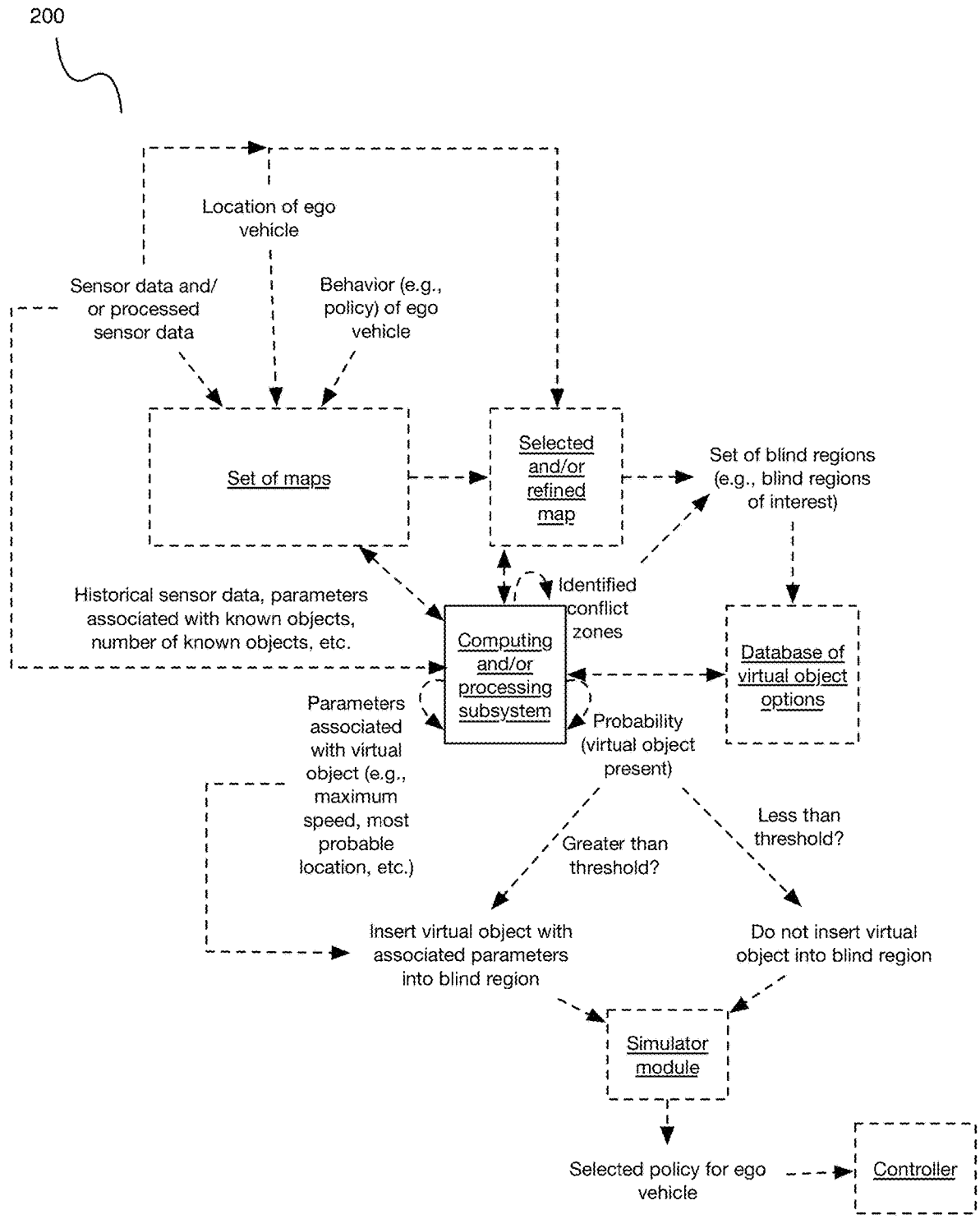
FIG. 8 depicts a schematic variation of at least a portion of a method and/or system for operating an autonomous agent.

The system can optionally include and/or interface with one or more maps (e.g., as shown in FIG. 8), wherein the maps can function to provide information associated with any or all of: a set of routes (e.g., predetermined routes of the autonomous agent, potential routes of other agents, etc.); conflict zones (e.g., areas in which multiple routes intersect, areas in which cross traffic can be present, etc.); one or more lane policies (e.g., predetermined set of lane policies for ego agent, other agents, other objects, etc.) assigned to a route; parameters and/or features (e.g., associated speed limits, lane widths, etc.) associated with a route; and/or any other information.

In a preferred set of variations, the system includes and/or interfaces with a map including regions (e.g., with hard-coded routes) from which conflict zones can be determined a set of hardcoded conflict zones which the autonomous agent can compare with blind regions in the method 200 described below. Additionally or alternatively, the conflict zones and/or any other information can be hard coded directly in one or more maps, the map(s) can be absent of any or all hard-coded information, and/or the map(s) can include any other information.

The system can optionally interface with a teleoperator platform, which refers to one or more remote teleoperators and associated components (e.g., communication interface with autonomous agent, computing system, output devices for displaying information from autonomous agents and/or infrastructure devices to teleoperators, input devices for receiving instructions/commands from teleoperators, etc.). The teleoperator platform can function to receive inputs from teleoperators, which can be used at least partially in the determination of the curated behavioral policies for the vehicle.

Additionally or alternatively, the system 100 can include and/or interface with any other suitable components.

4. Method 200

As shown in FIG. 2, a method 200 for operating an autonomous agent with incomplete environmental information includes any or all of: receiving a set of inputs S21o; determining a set of blind regions in the ego vehicle's environment S22o; and inserting a set of virtual objects into the set of blind regions S240; and; and/or any other suitable processes. Additionally or alternatively, the method 200 can include any or all of: determining a set of known objects in the ego vehicle's environment S215; selecting a set of virtual objects based on the set of blind regions S230; operating the autonomous agent based on the set of virtual objects S250; and/or any other suitable processes. Further additionally or alternatively, the method 200 can include and/or interface with any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; and U.S. application Ser. No. 17/554,619, filed 17 Dec. 2021; each of which is incorporated herein in its entirety by this reference, or any other suitable processes performed in any suitable order.

The method 200 is preferably performed with a system 100 as described above, but can additionally or alternatively be performed with any other suitable system(s).

The method 200 preferably functions to operate (e.g., efficiently operate, safely operate, etc.) an autonomous agent with incomplete information of its environment. Additionally or alternatively, the method 200 can function to enable the autonomous agent to drive similarly to a human, optimize for and/or minimize a computational cost of operating the autonomous agent, and/or can perform any other suitable function(s).

The method 200 can optionally be performed in a fixed route or semi-fixed route environment. Additionally or alternatively, the method 200 can be performed in a dynamically-determined route environment, any combination of environments, and/or any other suitable environment.

The method 200 is preferably configured to interface with a multi-policy decision-making process (e.g., multi-policy decision-making task block of a computer-readable medium) of the ego agent and any associated components (e.g., computers, processors, software modules, etc.), but can additionally or alternatively interface with any other decision-making processes. In a preferred set of variations, for instance, a multi-policy decision-making module of a computing system (e.g., onboard computing system) includes a simulator module (or similar machine or system) (e.g., simulator task block of a computer-readable medium) that functions to predict (e.g., estimate) the effects of future (i.e., steps forward in time) behavioral policies (operations or actions) implemented at the ego agent and optionally those at each of the set environmental objects (e.g., known objects, virtual objects, etc.) identified in an operating environment of the ego agent. The simulations can be based on a current state of each agent (e.g., the current hypotheses) and/or historical actions or historical behaviors of each of the agents derived from the historical data buffer (preferably including data up to a present moment). The simulations can provide data relating to interactions (e.g., relative positions, relative velocities, relative accelerations, etc.) between projected behavioral policies of each environmental agent and the one or more potential behavioral policies that may be executed by the autonomous agent. The data from the simulations can be used to determine (e.g., calculate) any number of metrics, which can individually and/or collectively function to assess any or all of: the potential impact of the ego agent on any or all of the environmental agents when executing a certain policy, the risk of executing a certain policy (e.g., collision risk), the extent to which executing a certain policy progresses the ego agent toward a certain goal, and/or determining any other metrics involved in selecting a policy for the ego agent to implement.

The set of metrics can optionally include and/or collectively determine (e.g., through aggregating any or all of the set of metrics described below) a cost function (and/or loss function) associated with each proposed ego agent policy based on the set of simulation(s) performed for that proposed policy. Additionally or alternatively, the set of metrics described below can be individually determined and/or analyzed, other metrics can be determined, the metrics can be aggregated in other suitable ways, and/or the metrics can be otherwise configured. With these metrics and/or functions, a best policy from the set of policies can be selected, such as by comparing the metrics and/or functions among the different proposed policies (e.g., and selecting the policy which has a lowest cost/loss function, selecting the policy which optimizes [e.g., maximizes, minimizes, etc.] an objective function, etc.).

The multi-policy decision-making process can additionally or alternatively include and/or interface with any other processes, such as, but not limited to, any or all of the processes described in: U.S. application Ser. No. 16/514,624, filed 17 Jul. 2019; and U.S. application Ser. No. 17/365,538, filed 1 Jul. 2021; each of which is incorporated in its entirety by this reference, or any other suitable processes performed in any suitable order.

Additionally or alternatively, the method 200 can include and/or interface with any other decision-making processes.

The method 200 is preferably performed with and/or at a set of computing subsystems and/or processing subsystems associated with the ego vehicle (e.g., onboard the ego vehicle, in communication with the ego vehicle, etc.), but can additionally or alternatively be performed with any other suitable components and/or combination of components.

4.1 Method—Receiving a Set of Inputs S210

The method 200 can include receiving a set of inputs S210, which functions to receive information with which to assess an environment of the ego vehicle. S210 can additionally or alternatively function to receive information with which to detect that the ego vehicle is in or approaching a particular region and/or scenario (e.g., predetermined zone and/or scenario, conflict zone, etc.), detect one or more blind regions in the ego vehicle's environment, determine an overlap of a blind region with a particular zone, and/or can perform any other suitable functions.

S210 is preferably performed initially in the method 200, and further preferably throughout operation of the ego vehicle, such as any or all of: continuously (e.g., throughout the ego vehicle's traversal of a route, while the ego vehicle is driving, during the method 200, etc.), at a predetermined frequency, at a random set of intervals, in response to a trigger, and/or at any suitable times. Additionally or alternatively, S210 can be performed once, in response to another process of the method 200, at any suitable time(s) during the method 200, and/or instances of the method 200 can be performed in absence of S210.

S210 is preferably performed at a set of computing subsystems and/or processing subsystems associated with the ego vehicle (e.g., onboard the ego vehicle, in communication with the ego vehicle, etc.), but can additionally or alternatively be performed with any other suitable components and/or combination of components.

The set of inputs preferably includes sensor inputs received from any or all of a set of sensors arranged onboard the ego vehicle (e.g., as described above), such as from any or all of the sensors described above (e.g., light detection and ranging [LiDAR] sensors, radio detection and ranging [RADAR] sensors, cameras, microphones, etc.). Additionally or alternatively, sensor inputs can be received from any suitable sensors (e.g., remote from the agent, part of one or more infrastructure devices, etc.), other information sources (e.g., online information sources, databases, etc.), other agents and/or objects, and/or any other suitable sensors.

The sensor inputs preferably function to detect and/or indicate occlusions and/or obstructions in the ego vehicle's environment, which represent regions of which the ego vehicle has an incomplete understanding (e.g., does not know whether or not an object is present within the region). Additionally or alternatively, the sensor inputs can function to detect known objects (e.g., in S215) in the ego vehicle's environment, determine parameters (e.g., speed, location, position, etc.) associated with the ego vehicle and/or known objects, detect features in the ego vehicle's environment (e.g., detect the occurrence of a conflict zone), and/or determine/detect any other information.

The sensor inputs are preferably collected at least in part from sensors which characterize the ego vehicle's environment in 3 (or more) dimensions (e.g., LiDAR sensors, RADAR sensors, a multi-camera system, etc.), and further preferably from sensors which can be used to detect occlusions (e.g., obstructions, shadows, etc.) in the 3D environment (e.g., LiDAR sensors). Additionally or alternatively, any other sensors configured for any data detection can be used.

In a preferred set of variations, the sensor inputs include data from a set of LiDAR sensors (e.g., coupled to the ego vehicle). In specific examples, the LiDAR data is used (e.g., as described below) to detect a set of objects and associated object heights in the ego vehicle's environment, where this height information can be used to detect which regions are obstructed from detection by the ego vehicle.

Additionally or alternatively, the sensor inputs can include data from any or all of: cameras, RADAR sensors, and/or any other sensors. In some examples, for instance, data from a set of cameras is collected and analyzed (e.g., with a set of computer vision processes) to characterize the environment and detect if there are any regions which might be obstructed from view (e.g., based on detected known objects). In other examples, multiple types of sensor data (e.g., aggregated data, fused data, etc.) are used (e.g., camera data and LiDAR data, camera data and RADAR data, LiDAR data and RADAR data, etc.).

The set of inputs can optionally additionally or alternatively include historical information, which preferably functions to inform (e.g., in S230) whether or not a virtual object should be added to a blind region, and/or if it should be added, what parameter values (e.g., speed value, dimensions, etc.) should be attributed to (e.g., assigned to in a simulation or other analysis, implemented with, etc.) the virtual object. The historical information can be collected from any or all of: a set of sensors (e.g., onboard the ego vehicle, offboard the ego vehicle, etc.), a set of databases, a set of simulations, and/or any other sources.

The historical information preferably includes information (e.g., data) associated with the ego vehicle's environment at previous time steps, such as prior data (e.g., prior trajectories/paths, prior positions, prior speeds, prior accelerations, etc.) associated with known objects in the ego vehicle's environment, prior data associated with the ego vehicle itself (e.g., prior path, prior positions, prior speeds, prior elected policies/behaviors, etc.), prior data associated with a blind region, prior data associated with the location of a detected blind region, and/or any other types of information.

In a set of variations in which simulations are performed to simulate and select policies for the vehicle, the historical information can optionally additionally or alternatively include data which was used in prior simulations.

The historical information can optionally be collected at any or all of: the ego vehicle during the current trip, the ego vehicle during a previous trip, multiple vehicles (e.g., and aggregated), and/or otherwise be collected from any suitable sources.

In some variations, for instance, the historical information includes and/or is used to determine any or all of: how long a blind region has been a blind region (e.g., whether or not a blind region is caused by a static vs. a dynamic object, whether or not the ego vehicle was previously able to detect information at the location of a currently blind region, etc.); whether or not a known object which was previously present is now missing; whether or not a known object which was previously not detected is now detected; at what speed other objects in the ego vehicle's environment have been moving; and/or any other information.

The set of inputs can optionally additionally or alternatively include supplementary information (equivalently referred to herein as supplemental information), where the supplementary information preferably functions to inform if and/or how virtual objects should be added to a blind region, but can additionally or alternatively perform any other functions.

The supplementary information can include, but is not limited to, any or all of: a set of one or more maps (e.g., as described below); parameters (e.g., speed value, acceleration value, location, position, orientation, etc.) and/or other information (e.g., a suspected policy/behavior, a previously suspected policy/behavior, etc.) associated with known objects in the ego vehicle's environment; parameters and/or information (e.g., parameters, a current policy/behavior, previous policies/behaviors, etc.) associated with the ego vehicle; supplemental information associated with the ego vehicle's environment (e.g., from offboard sensors, from databases, etc.); and/or any other information.

In a first set of variations, S210 includes collecting sensor data from at least a set of one or more LiDAR sensors and optionally from a set of databases (e.g., storing maps, storing historical data, storing supplementary information, etc.).

In a second set of variations, S210 includes collecting sensor data from a set of cameras (e.g., multiple cameras) and optionally from a set of databases (e.g., storing maps, storing historical data, storing supplementary information, etc.).

In a third set of variations, S210 includes collecting sensor data from a set of RADAR sensors and optionally from a set of databases (e.g., storing maps, storing historical data, storing supplementary information, etc.).

In a fourth set of variations, S210 includes collecting sensor data from multiple types of sensors (e.g., aggregated data from multiple sensors/sensor types, fused data from multiple sensors/sensor types, etc.) and optionally from a set of databases (e.g., storing maps, storing historical data, storing supplementary information, etc.).

Additionally or alternatively, S210 can include any other suitable processes.

4.2 Method—Determining a Set of Known Objects in the Ego Vehicle's Environment S215

The method 200 can optionally include determining (e.g., detecting, characterizing, classifying, etc.) a set of known objects in the ego vehicle's environment, which can function to enable any or all of: the performance of a set of simulations (e.g., to simulate and select a policy for the ego vehicle to implement); the detection of one or more blind regions in S220 (e.g., based on detecting that the placement of a known object is causing a region proximal to it to be occluded to the ego vehicle); the determination of whether or not a virtual object should be placed in a blind region (e.g., based on the ego vehicle's knowledge of how known objects are traveling through its environment); the assignment of one or more parameters to a virtual object (e.g., based on the ego vehicle's knowledge of how known objects are traveling through its environment, based on the current and/or prior speeds of known objects, based on the detected behavior of a known object, etc.); and/or any other functions.

S215 is preferably performed in response to and based on S210 (e.g., at each instance of S210), and further preferably based on any or all sensor information collected in S210 (e.g., camera data, LiDAR data, RADAR data, etc.), but can additionally or alternatively be performed based on any other data collected in S210; in response to another process of the method 200; multiple times during the method 200 and/or during operation of the ego vehicle (e.g., continuously, at a predetermined frequency, at a predetermined cycle, etc.); and/or at any other times. Alternatively, the method 200 can be performed in absence of S215.

S215 is preferably performed at a set of computing subsystems and/or processing subsystems associated with the ego vehicle (e.g., onboard the ego vehicle, in communication with the ego vehicle, etc.), but can additionally or alternatively be performed with any other suitable components and/or combination of components.

S215 can optionally be used to determine, detect, and/or classify the set of blind regions in S220. In some variations, for instance, the blind regions and/or their associated parameters (e.g., size, location, etc.) are determined (e.g., in part, fully, etc.) based on the set of known objects (e.g., known object size, known object location, known object historical information, etc.). Alternatively, the blind regions can be determined independently of known objects.

A known object preferably refers herein to an object which can be detected by the ego vehicle (e.g., is not obstructed, is not within a blind region, etc.). Known objects can include any suitable objects (e.g., dynamic objects, static objects, etc.), such as, but not limited to, any or all of: vehicles (e.g., cars, vans, trucks, buses, trains, planes, motorcycles, etc.); bicycles; pedestrians; static objects (e.g., trees, lamp posts, rode geometry, signs, etc.); and/or any other objects. Additionally or alternatively, known objects can refer to objects which are of interest to the ego vehicle (e.g., within a predetermined distance threshold), and/or any other objects. Further additionally or alternatively, S215 can include detecting features of the road geometry (e.g., lane lines, traffic lights, etc.) and/or any other information.

S215 can optionally include characterizing (e.g., classifying) any or all of the known objects, such as based on object type, importance, and/or any other metrics.

S215 can optionally additionally or alternatively include determining (e.g., calculating, detecting, predicted, etc.) one or more parameters associated with any or all of the known objects, such as, but not limited to: speed, position (e.g., location), orientation, pose, behavior/policy (e.g., as predicted based on other parameters and/or historical information), intent, and/or any other information. Any or all of the parameters can optionally be used for: simulating the known objects; determining whether or not a virtual object should be present in a blind region; determining the parameters to be attributed to any or all virtual objects; and/or can be otherwise suitably used.

In a preferred set of variations, S215 includes detecting a set of known objects in the ego vehicle's environment and determining (e.g., with a set of dynamics equations, based on sensor data, with a set of trained models, etc.) a set of parameters associated with each of the known objects.

4.3 Method—Determining a Set of Blind Regions in the Ego Vehicle's Environment S220

The method 200 can include determining (e.g., detecting, characterizing, classifying, etc.) in the ego vehicle's environment S220, which functions to determine areas in which the ego vehicle does not detect information and/or areas in which the ego agent detects that information is missing. Additionally or alternatively, S220 can function to determine a conflict zone, detect the overlap and/or predicted overlap between a blind region and a conflict zone, eliminate blind regions from further consideration and/or processing, and/or can perform any other suitable function(s).

S220 is preferably performed in response to and based on S21o and further preferably multiple times (e.g., continuously, at a predetermined frequency, etc.) during operation of the ego agent, but can additionally or alternatively be performed at any or all of: in response to and/or based on S215; in response to a trigger (e.g., the detection of a conflict zone); in response to other processes of the method 200; in absence of S210 and/or S215; and/or at any other suitable time(s).

S220 is preferably performed at a set of computing subsystems and/or processing subsystems associated with the ego vehicle (e.g., onboard the ego vehicle, in communication with the ego vehicle, etc.), but can additionally or alternatively be performed with any other suitable components and/or combination of components.

Figure 6:
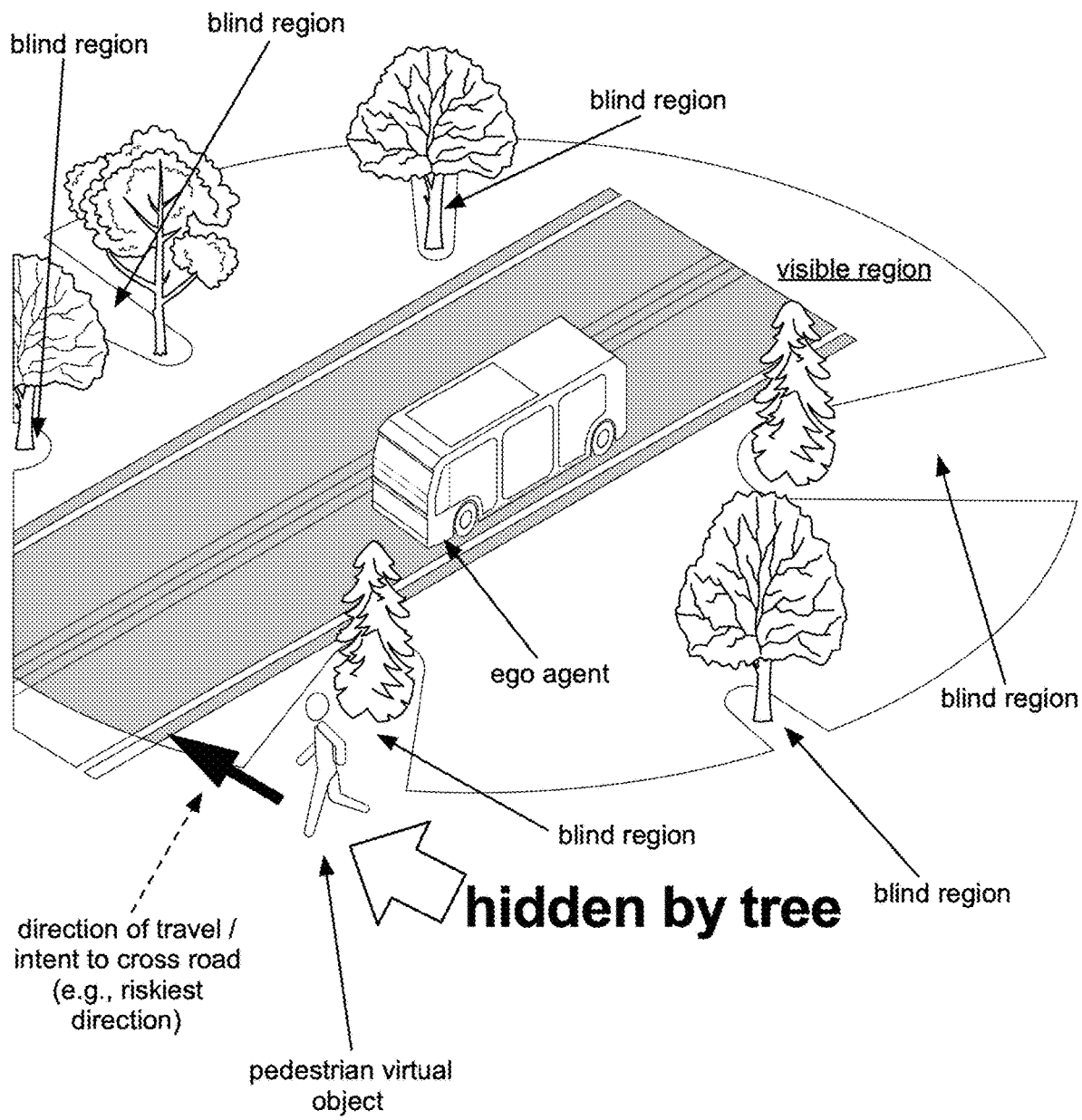
FIG. 6 depicts a schematic variation of a visible region and a set of blind regions of an autonomous agent in its environment.

A blind region (equivalently referred to herein as a blind spot, low visibility region, no visibility region, obstructed region, occluded region, unknown region, etc.) refers to an area and/or region which is not detectable (and/or detectable with high noise and/or low confidence) by a sensor system associated with the ego vehicle (e.g., not part of a visible region of the agent as shown in FIG. 6), such as any or all of: a sensor system (e.g., LIDAR sensors, cameras, RADAR sensors, etc.) onboard the autonomous agent, a sensor system onboard one or more infrastructure devices, a sensor system onboard other agents and/or objects, a sensor fusion system, and/or any other components.

A blind region is preferably caused by an obstruction (e.g., known object, infrastructure, etc.), such as an object arranged between the ego vehicle and the blind region (e.g., next to the blind region), where the object or other obstruction obstructs the ego vehicle from detecting (e.g., sensing, seeing, etc.) information in the blind region. Blind regions can additionally or alternatively be caused by any or all of: a number and/or arrangement of sensors onboard the ego agent (e.g., resulting in certain angles which cannot be detected); failure of one or more sensors; environmental conditions (e.g., glare, rain, fog, etc.) of the ego agent; and/or based on any other causes.

The blind region is preferably detected based on any or all of a set of sensors and a computing system of the ego agent (e.g., as described above), but can additionally or alternatively be determined based on processing the sensor data, such as based on any or all of: a set of programmed rules, a set of machine learning models, and/or any other information. Alternatively, the blind region can be detected with data other than sensor data, predetermined, and/or otherwise suitably determined.

The blind region is preferably at least partially dynamically determined, wherein the occurrence of a blind region and/or its associated parameters are continuously (e.g., at a predetermined frequency) determined (e.g., searched for, detected, etc.) during operation of the ego agent. Additionally or alternatively, the blind region can be any or all of: predetermined, fixed (e.g., a fixed region relative to one or more reference points of the ego agent), determined at any other times (e.g., at random intervals, at a single time during a trip of the ego agent, in response to a trigger such as the detection of a conflict zone, etc.), and/or otherwise suitably determined.

The blind region can be associated with and/or defined by any number of parameters such as any or all of: an area of the blind region (e.g., based on a projection to the road surface), a volume of the blind region, one or more length parameters of the blind region (e.g., distance extending from the ego agent, distance ahead of the ego agent, distance offset from the ego agent, etc.), an angle of the blind region, a height of the blind region (e.g., offset to the ground), and/or any other suitable parameters.

In some variations, for instance, blind regions are detected based at least in part on a set of height parameters (e.g., height deviations) associated with a detected environmental representation (e.g., as detected with a set of LiDAR sensors). In specific examples, a height parameter used to detect and/or classify a blind region includes a height relative to the ground (e.g., road surface), such that in an event that the ego vehicle is not able to detect information at the ground and/or within a predetermined height above the ground (e.g., tall enough height for an object to be concealed within), that region is categorized as blind.

S220 can optionally include comparing any or all of these parameters with a set of thresholds (e.g., bounds, limits, etc.), such that, for instance, blind regions can be eliminated from consideration based on these comparisons. The thresholds can enforce for instance, any or all of: a minimum size of the blind region (e.g., wherein blind regions below this size threshold are eliminated from consideration since no effective object can fit within the blind region), a minimum height of the blind region relative to the road surface, a maximum distance away from the ego agent (e.g., wherein blind regions far away from the agent are not considered, etc.), a location of the blind region (e.g., relative to road geometry and/or landmarks), and/or any other thresholds.

S220 can optionally include determining (e.g., detecting, characterizing, classifying, etc.) a set of zones in the ego vehicle's environment, where determining the set of zones can function to: determine which blind regions to perform further processing on (e.g., eliminate blind regions from further processing); prioritize which blind regions to further process; conserve computational resources; and/or perform any other functions.

The set of zones can be any or all of: predetermined (e.g., assigned to/hardcoded into a map), inferred and/or computed from predetermined map data, dynamically determined (e.g., based on sensor system of ego agent, based on sensors of infrastructure devices, etc.), determined in any combination of ways, and/or otherwise suitably determined.

In some variations, for instance, any or all of the set of zones are determined (e.g., identified) based on a set of maps, wherein the set of maps are labeled (e.g., pre-labeled, hand labeled, dynamically labeled, etc.) with zones of interest (e.g., for further processing of blind regions). The maps are preferably referenced based on at least a location of the ego vehicle and optionally any or all of the environmental representation (e.g., to match with detected road geometry), but can additionally or alternatively be otherwise retrieved and/or referenced (e.g., based on a current policy of the ego vehicle, based on a proposed policy for the ego vehicle, etc.). The maps can be any or all of: 3D, 2D, and/or have any other dimensions. The maps can include any or all of: a single map, multiple maps (e.g., multiple map options wherein each map is configured for a particular policy/behavior for the ego vehicle), and/or any combination of maps and/or map options.

In additional or alternative variations, any or all of the zones are detected dynamically. In specific examples, for instance, sensor data can be processed (e.g., with a trained model, with computer vision processes, etc.) to classify zones of interest (e.g., based on parameters described below for conflict zones, based on historical information, etc.).

The zones of interest preferably include what is referred to herein as a set of conflict zones, where S220 includes detecting and/or determining that the blind region is partially or fully overlapping with a conflict zone. A conflict zone refers to any region where the potential exists for multiple paths to conflict (e.g., intersect, overlap, etc.), such as any regions where 2 or more lanes can overlap in geometry (e.g., split, merge, cross, etc.), or any other regions. In preferred variations, a conflict zone refers to a region in which the ego agent and/or a route (e.g., fixed route, dynamic route, etc.) of the ego agent could potentially encounter other objects, such as in experiencing cross traffic (e.g., intersections, parking lots, driveways, etc.), parallel traffic (e.g., in lane changes), and/or any other types of encounters, where traffic can include vehicular traffic, pedestrian traffic, and/or any other encounters with any suitable objects. Additionally or alternatively, a conflict zone can be otherwise suitably defined, include a subset of these use cases, include additional use cases, and/or be otherwise determined.

The conflict zone is preferably assigned at least in part based on road features and/or geometry (e.g., the present of an intersection, the splitting and/or merging of lane lines, etc.), but can additionally or alternatively be determined based on other infrastructural information (e.g., house locations, driveway locations, sidewalks, etc.), historical information (e.g., previous conflicts and/or near conflicts), dynamic information (e.g., current traffic conditions, accident alerts, construction alerts, etc.), and/or any other information.

The conflict zone can optionally be dependent on a behavior and/or policy of the agent, such as a conflict zone which is present when the ego agent is performing (and/or is proposed to perform) a lane change behavior but not present when the ego agent is maintaining its lane. Additionally or alternatively, the conflict zone can be dependent on other features associated with the ego agent, independent of any or all of this information, any combination, and/or otherwise determined. In a specific example, for instance, a neighboring lane traveling in the same direction to the ego vehicle is only considered a conflict zone in cases in which a lane change policy is proposed for the ego vehicle.

The conflict zone can additionally or alternatively be dependent on any or all of: a virtual object type (e.g., wherein conflict zones for pedestrian and/or bike virtual objects are more numerous and/or less constrained to road geometry relative to car virtual objects); the direction of travel of lanes within the conflict zone (e.g., only include the subset of lanes which have a direction of travel relevant to the ego vehicle); and/or can be otherwise determined.

S220 can optionally include comparing a set of blind region candidates with the set of zones to determine a set of blind regions for further processing. The blind regions for further processing preferably include those which overlap with (e.g., touch, partially overlap with, are fully arranged within, etc.) a zone of interest (e.g., conflict zone), but can additionally or alternatively those proximal to a zone of interest (e.g., within a predetermined distance threshold of), and/or any other zone(s). Alternatively, all zones can be considered, zones can be considered otherwise, and/or S220 can be otherwise suitably performed.

In some variations, S220 includes (and/or is triggered in response to) detecting a conflict zone and/or determining that a blind region overlaps and/or is predicted to overlap (e.g., based on a route of the ego agent, based on a current location of the ego agent, based on a speed of the ego agent, etc.) with a conflict zone (e.g., based on overlaying the detected blind region with a set of maps including labeled conflict zones), which can have benefits in computational efficiency and/or function to prevent overly cautious behavior of the ego agent based on blind regions outside of conflict zones (e.g., in which it is not necessary to know if there is an object present in a blind region). In specific examples, this is determined based on locating the ego agent within a map including a computed (e.g., precomputed) set of conflict zones (e.g., as described above), wherein the set of predetermined conflict zones is determined based on locating the ego vehicle within the map (e.g., based on ego vehicle position, based on lane geometry, etc.). Additionally or alternatively, the conflict zones can be hard-coded, the conflict zone can be determined based on any other maps and/or in absence of maps, the blind regions can be processed absent of a comparison with predetermined zones, and/or the conflict zones can be otherwise determined.

Any or all of the remaining processes of the method 200 are preferably performed in advance of the ego agent reaching the conflict zone, such as in a forward simulation which simulates each of a set of potential policies for the ego vehicle before it reaches the conflict zone, but can additionally or alternatively be otherwise performed.

In a first variation, S220 includes continuously and dynamically searching for blind regions associated with the ego agent based on sensor information from onboard the ego agent and optionally from other sensor systems (e.g., of one or more infrastructure devices, of other agents and/or objects, etc.).

In a second variation, additional or alternative to the first, S220 includes detecting any or all of: that the ego agent is in a conflict zone, that the ego agent is approaching a conflict zone (e.g., within a predetermined distance of a conflict zone, within a predetermined time of reaching a conflict zone based on a speed of the ego agent, etc.), that a blind region of the ego agent is overlapping with and/or predicted to overlap with a conflict zone, and/or any other information.

In a third variation, additional or alternative to the above, any or all of the blind regions detected in S220 are fixed/predetermined (e.g., relative to the ego agent).

Additionally or alternatively, S220 can be otherwise suitably performed.

4.4 Method—Selecting a Set of Virtual Objects Based on the Blind Region S230

The method 200 can include selecting a set of virtual objects based on the blind region S230, which functions to determine virtual objects to place into the blind region (e.g., as described in S240), such that the ego agent can consider the blind region (e.g., just as any other region) in its decision making (e.g., policy selection such as in a multi-policy decision-making module, planning, prediction, trajectory generation, etc.). Additionally or alternatively, S230 can function to select virtual objects which maintain safety goals without requiring that the ego agent behave overly cautiously, and/or can perform any other functions.

S230 is preferably performed in response to S220 and based on the blind region(s) determined in S220, but can additionally or alternatively be performed in response to another process of the method 200; in absence of S220; multiple times (e.g., continuously, at a predetermined frequency, etc.) during the method 200 and/or operation of the ego vehicle; in response to a trigger; and/or at any other times and/or based on any other information (e.g., the conflict zone).

S230 is preferably performed with and/or at a set of computing subsystems and/or processing subsystems associated with the ego vehicle (e.g., onboard the ego vehicle, in communication with the ego vehicle, etc.), but can additionally or alternatively be performed with any other suitable components and/or combination of components.

A virtual object preferably refers herein to an object (e.g., vehicle/agent, pedestrian, bicycle, construction zone/construction materials, etc.) which could potentially be located in a blind region, but is not known (and/or is known with a confidence below a threshold) to be in the blind region (e.g., since the blind region is not detectable by the ego agent). Additionally or alternatively, virtual objects can be otherwise suitably defined.

The virtual object is preferably selected/determined based on any or all of the parameters and/or features of the blind region, such as any or all of those described above. In preferred variations, for instance, the virtual object is determined based on a size of the blind region, wherein the virtual object is selected based on what would physically fit into the blind region (e.g., as shown in FIGS. 9A-9E). In specific examples, a library of sizes for standard objects is referenced to determine whether the blind region is big enough to fit a vehicle, or only a bicycle, or only a pedestrian, and so forth. In some variations, the largest possible virtual object is selected for any or all of the blind regions, which functions to account for worst-case scenarios. Additionally or alternatively, the virtual object(s) can be otherwise selected (e.g., based on which virtual object is most likely to be present, based on which virtual object would result in a worst-case scenario, based on which virtual object could be traveling the fastest, based on which virtual object could be traveling with the greatest speed difference relative to the ego vehicle, etc.). In another specific example, for instance, a bicycle could be selected over a vehicle for conflict zones which overlap with a designated bike lane.

The virtual object can additionally or alternatively be selected based on any other information and/or tools, such as any or all of: a set of machine learning models, a set of probabilistic and/or statistical models and/or processes producing outputs (e.g., predictions, probabilities, etc.) related to if an object were expected to be in a blind region and/or what object/object type would be expected to be in a blind region (e.g., based on historical and/or simulated data, based on the geographic location of the agent, based on the time of day, etc.), a set of rules, and/or any other suitable information.

In some variations, for instance, S230 includes performing an analysis (e.g., probabilistic analysis, statistical analysis, inference process, processing with a trained model, etc.) which functions to determine a likelihood (e.g., probability, confidence, distribution, etc.) associated with any or all of: any virtual object being in the blind region; a particular type of virtual object being in the blind region; and/or the parameters (e.g., speed) associated with a virtual object in the blind region. Additionally or alternatively, the analysis can function to determine (e.g., with a set of dynamics and/or kinematics and/or physics equations, with a machine learning model, with a deep learning model, with a decision tree, with a set of rules and/or a lookup table, etc.) any or all of the set of parameter values (e.g., speed value, location value, size dimensions, etc.) to assign to the virtual object. In specific examples, the parameter values are configured to represent a worst-case, yet realistic scenario, such as any or all of: the highest speed that the virtual object could be traveling at (e.g., highest speed which still has a probability above a predetermined threshold such as 5%, 10%, 15%, 20%, 25%, between 5-25%, 30%, 40%, 50%, between 25%-50%, 60%, greater than 50%, in any range bounded by these values, etc.); the largest size the object could reasonably have based on the size of the blind region and/or its location (e.g., relative to the road geometry); the closest location that the virtual object could have relative to the ego vehicle and/or a predicted location of the ego vehicle; and/or any other scenarios. This can function, for instance, to prevent scenarios which result in the ego vehicle getting "stuck" (e.g., stopped for a long period of time and unable to proceed forward, stopped for a long period of time at a static blind spot, etc.); driving in ways which are surprising and/or dangerous to other drivers (e.g., slamming on the brakes for no actual reason, etc.); driving in overly conservative ways; and/or otherwise operating non-optimally.

Any or all of the analyses to determine a set of likelihoods can take into account any or all of the following information (e.g., as shown in FIG. 8): detected information (e.g., sensor information, if the ego vehicle can detect regions proximal to the blind region, supplementary information, etc.); historical information (e.g., how long that the blind region has been a blind region, how many known objects were present previously vs. are present now, whether or not a known object has disappeared from the environmental representation, whether or not a known object has suddenly appeared in the environmental representation, etc.); aggregated information (e.g., from other sensor systems, from supplementary sensor systems, from an aggregated set of ego vehicles previously on the road, from an aggregated set of ego vehicles currently on the road, etc.); parameters and/or behaviors associated with the known objects (e.g., how fast they are traveling, if they are driving cautiously, etc.); how the ego vehicle's environment has changed over time; and/or any other information.

In specific examples, for instance, determining the virtual object's presence and/or any or all of its parameters can depend on any or all of: for what duration of time the blind region has existed (e.g., wherein if it has persisted for longer than a threshold, it is likely caused by a static object such as a lamp post or parked vehicle; wherein if it has persisted for longer than a threshold and no known object has entered or emerged from it, it likely has no object or a static object or a slow-moving object; etc.); how much of the blind region's immediate surroundings can be confidently detected (e.g., wherein if the ego vehicle can see around a blind region and also knows that in the previous time step no known object was near it, then there is likely no virtual object in the blind region; wherein if the ego vehicle can see around a blind region and also knows that in the previous time step a known object was near it and has since disappeared, then that known object with its previous parameters is likely present in the blind region, etc.); whether or not the number of known objects in the ego vehicle's environment has changed over time (e.g., wherein if a known object disappears proximal to where a blind region appears, that known object is likely in a blind region; wherein if a known object suddenly appears proximal to where a blind region is or was, then there is probably not an object currently in the blind region; etc.); historical information; the behavior and/or parameters associated with known objects (e.g., where if a known object is driving at a high speed toward a blind region, then there is likely no object in the blind region); conventions and/or traffic rules for that area (e.g., where if a known object is not maintaining a predetermined minimum stopping distance while behind a blind region, then there is a low probability that there is an object in the blind region; etc.); and/or any other information.

In a preferred set of variations, the analyses are performed with a set of probabilistic models, algorithms, and/or equations (e.g., untrained and/or unlearned models, trained and/or learned models, rule-based models, programmed models, etc.). Additionally or alternatively, any or all of the analyses can be performed with trained and/or learned models (e.g., machine learning models, deep learning models, etc.), statistical processes, decision trees, hard-coded logic, and/or any other tools.

Additionally or alternatively, any or all of the parameter values can be predetermined (e.g., based on a speed limit associated with the ego vehicle's location, constant, etc.), dynamically determined, determined based on historical information (e.g., the average speed at which vehicles travel in that area, the highest speed at which vehicles have traveled in that area, etc.), and/or otherwise suitably determined.

For instance, S230 can optionally include selecting a set of parameters and/or features associated with the virtual object(s). The parameters and/or features can optionally be configured to take into account a set of worst-case or otherwise potentially serious scenarios, such that the most conservative (potentially dangerous) option (e.g., largest size, closest location relative to ego agent, highest speed, etc.) for virtual object is selected. The worst-case scenarios can be determined based on any or all of: historical data, simulated data, aggregated data, and/or any other information. The features and/or parameters can additionally or alternatively be selected to not necessarily result in the worst-case scenario (e.g., which might result in overly cautious behavior of the ego agent) but rather fall within a spectrum of realistic worst-case scenarios (e.g., as described above, based on any of the information described above, etc.), such that extremely unlikely worst-case scenarios are ignored, as they would result in overly cautious and/or otherwise potentially disruptive behaviors for the ego agent.

The parameters and/or features can include, for instance, any or all of: a location of the obstacle relative to the ego agent, a speed of the obstacle, an acceleration of the obstacle, a behavior and/or intent of the obstacle, a size of the obstacle, a location of an agent virtual object within a lane of the road (e.g., in the middle of the lane, on an edge of the lane such as an edge closest to the ego agent, weaving within the lane, etc.), and/or any other parameters and/or features. In some variations, for instance, the virtual object is placed at a location which is any or all of: closest to the ego vehicle (e.g., the lane edge closest to the ego vehicle); closest to where the ego vehicle will be once the ego vehicle and the virtual object would enter a conflict zone and/or other high-risk scenario; most likely (e.g., based on road geometry, driving conventions, based on the locations of known objects, etc.); any combination; and/or otherwise located.

In specific examples, for instance, conservative parameters and/or features for the virtual object can include any or all of: a maximum speed (e.g., the speed limit, 5 mph above the speed limit, an average amount over the speed limit for that roadway, etc.), a closest proximity to the ego agent, a riskiest behavior (e.g., high acceleration, sudden braking, weaving in and out of a lane, etc.), and/or any other parameters/features.

Selecting the virtual object preferably includes selecting a type of virtual object, wherein the types of virtual objects can include, for instance, any or all of: a vehicle/agent (e.g., 4-wheeled vehicle, sedan, van, limousine, school bus or other bus, autonomous vs. manual vehicle, etc.), a bicycle (e.g., manual bike, electric bike, motorcycle, vespa, scooter, etc.), a pedestrian (e.g., walking pedestrian, running pedestrian, pedestrian with a strollers, etc.), static objects (e.g., traffic cones, other obstacles, etc.), and/or any other objects.

Figure 3A:
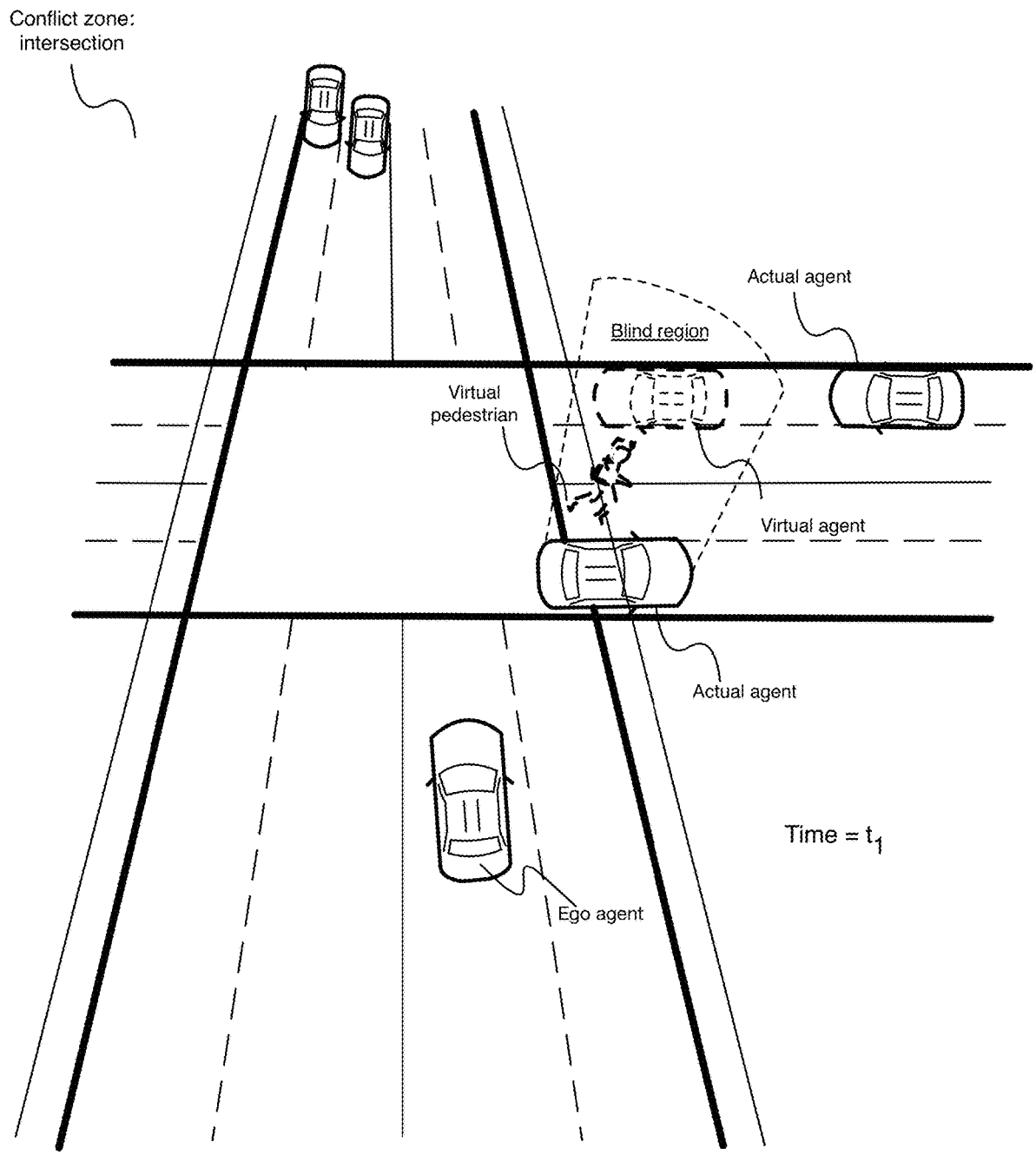
FIGS. 3A-3B depict a schematic variation of operating an autonomous agent in a first conflict zone at a set of time points.
Figure 3B:
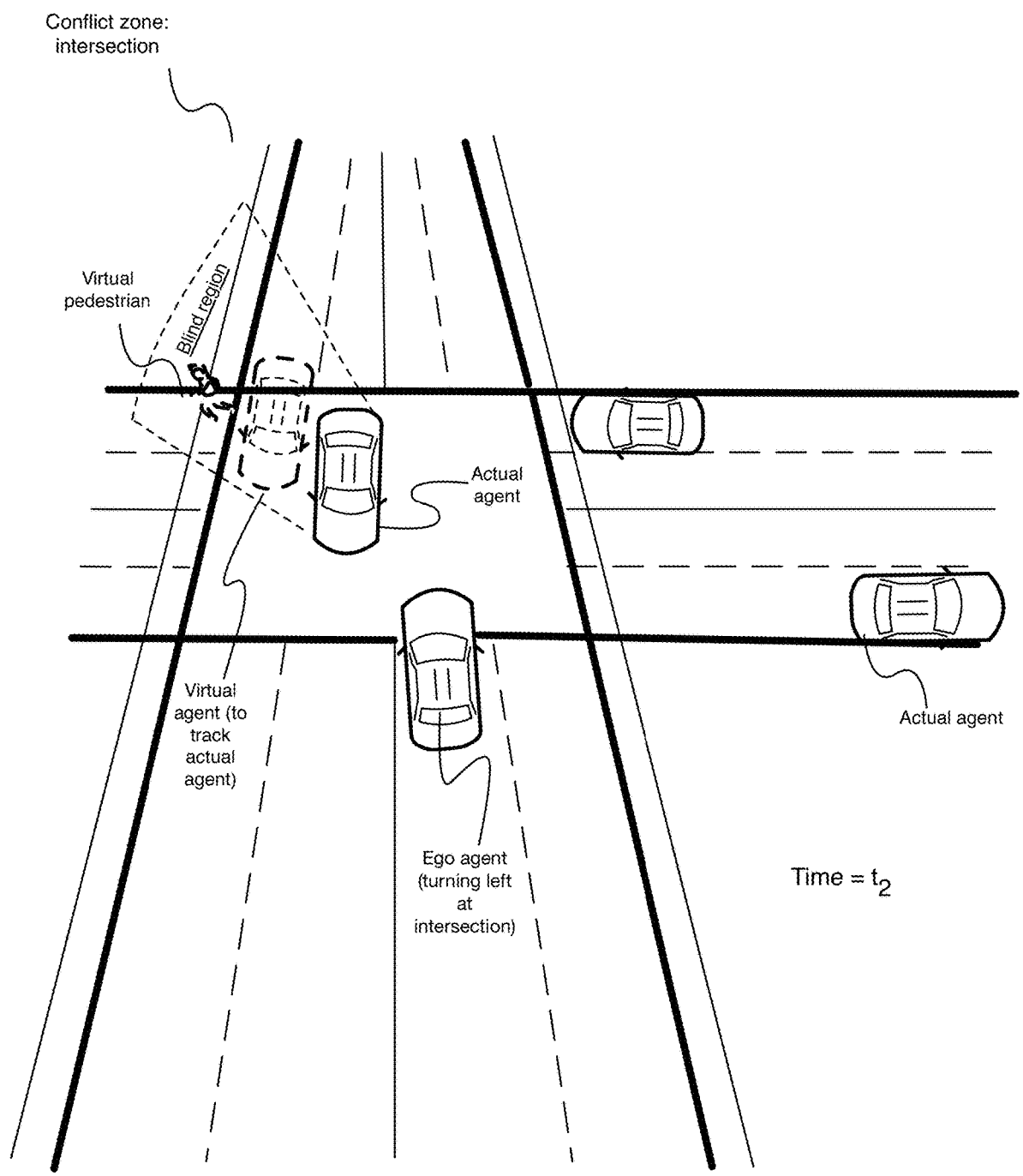

A virtual object can optionally be determined based on an actual object. In some variations, for instance, a virtual object can be selected which functions to track one or more real objects. In a specific example, for instance, a virtual object having features corresponding to (e.g., of the same type, make, model, speed of travel, etc.) a real object is selected and placed such that it replaces a known object which has become "invisible" to the ego agent (e.g., as shown in FIGS. 3A-3B). The virtual object can then optionally be removed once the real object is visible to the ego agent again and/or the blind region has disappeared.

S240 (and/or S250) can optionally include determining (e.g., predicting) and/or assigning a set of policies (e.g., behaviors, actions, trajectories, etc.) to each of the virtual objects, which functions to enable their interactions with the environment to be simulated in determining the response of the ego vehicle (e.g., as described below). Each virtual object is preferably assigned one or more policies (e.g., a single policy, multiple policies, etc.), but can additionally or alternatively not be assigned a policy and/or be otherwise configured.

In some variations, a virtual object can be assigned to have multiple behaviors and/or locations. In some examples, for instance, if the virtual object has the option to turn at an intersection, the virtual object can move (e.g., be simulated to move) in multiple directions (e.g., spawn/fan out) such that the method (e.g., simulations) accounts for the virtual object moving and/or turning in any possible direction.

Figure 9A:
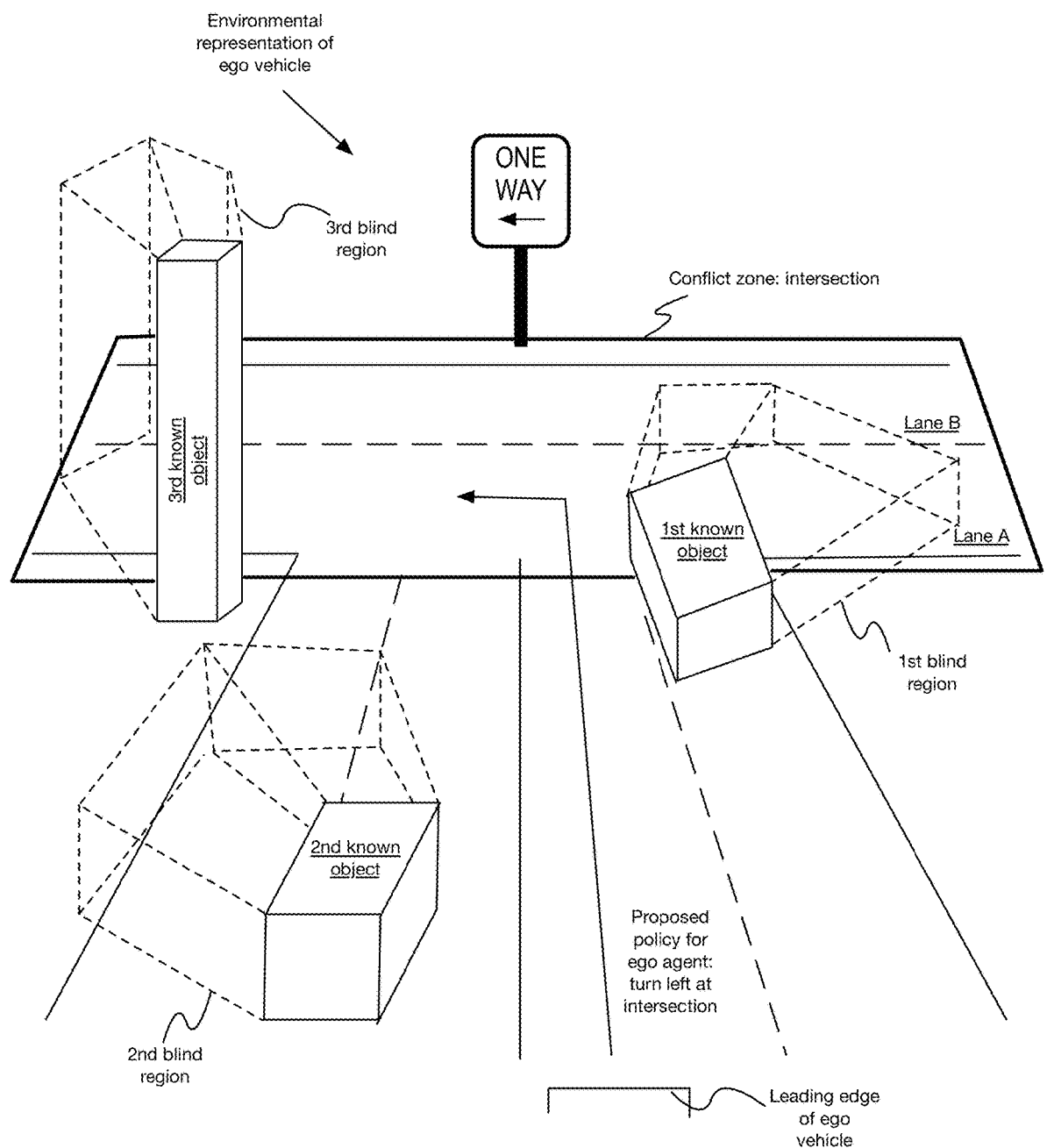
Figure 9C:
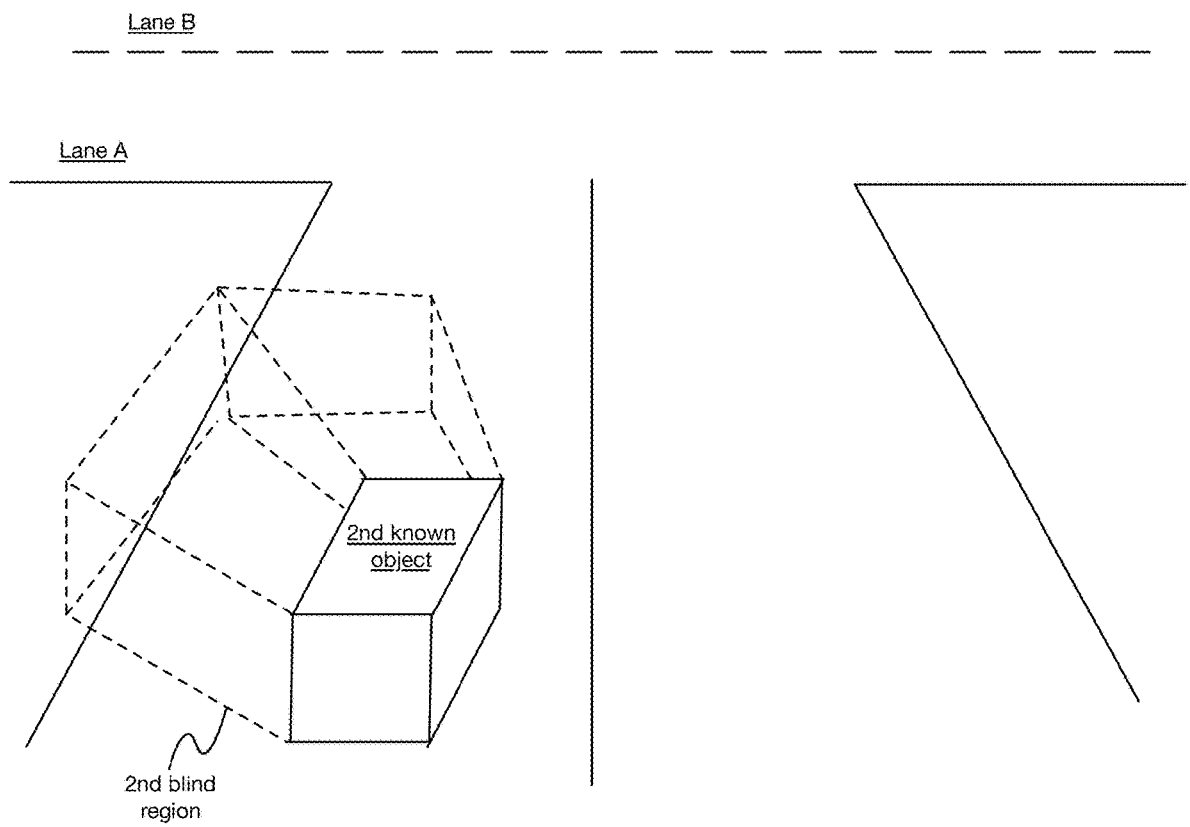
Figure 9D:
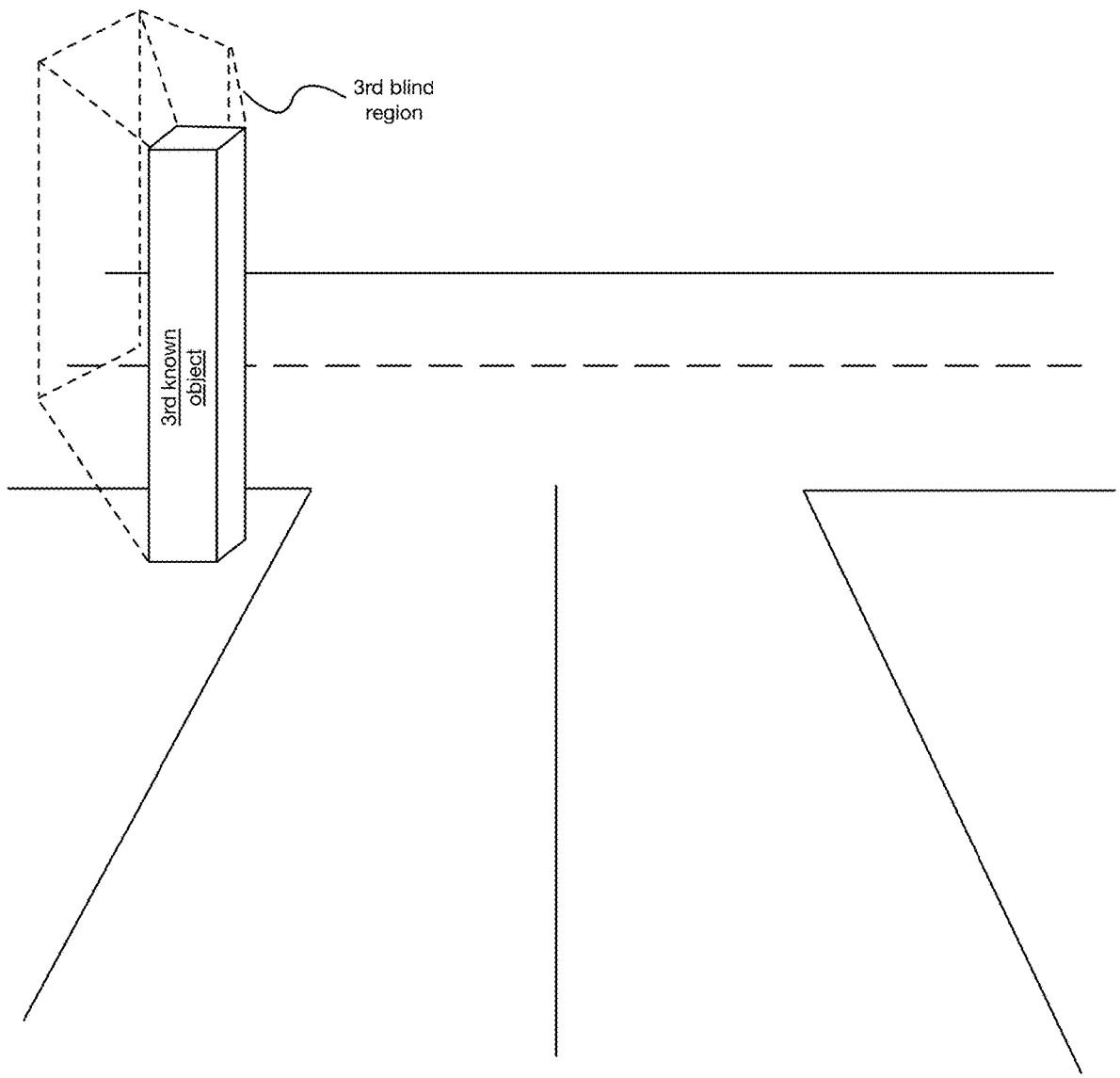
Figure 9E:
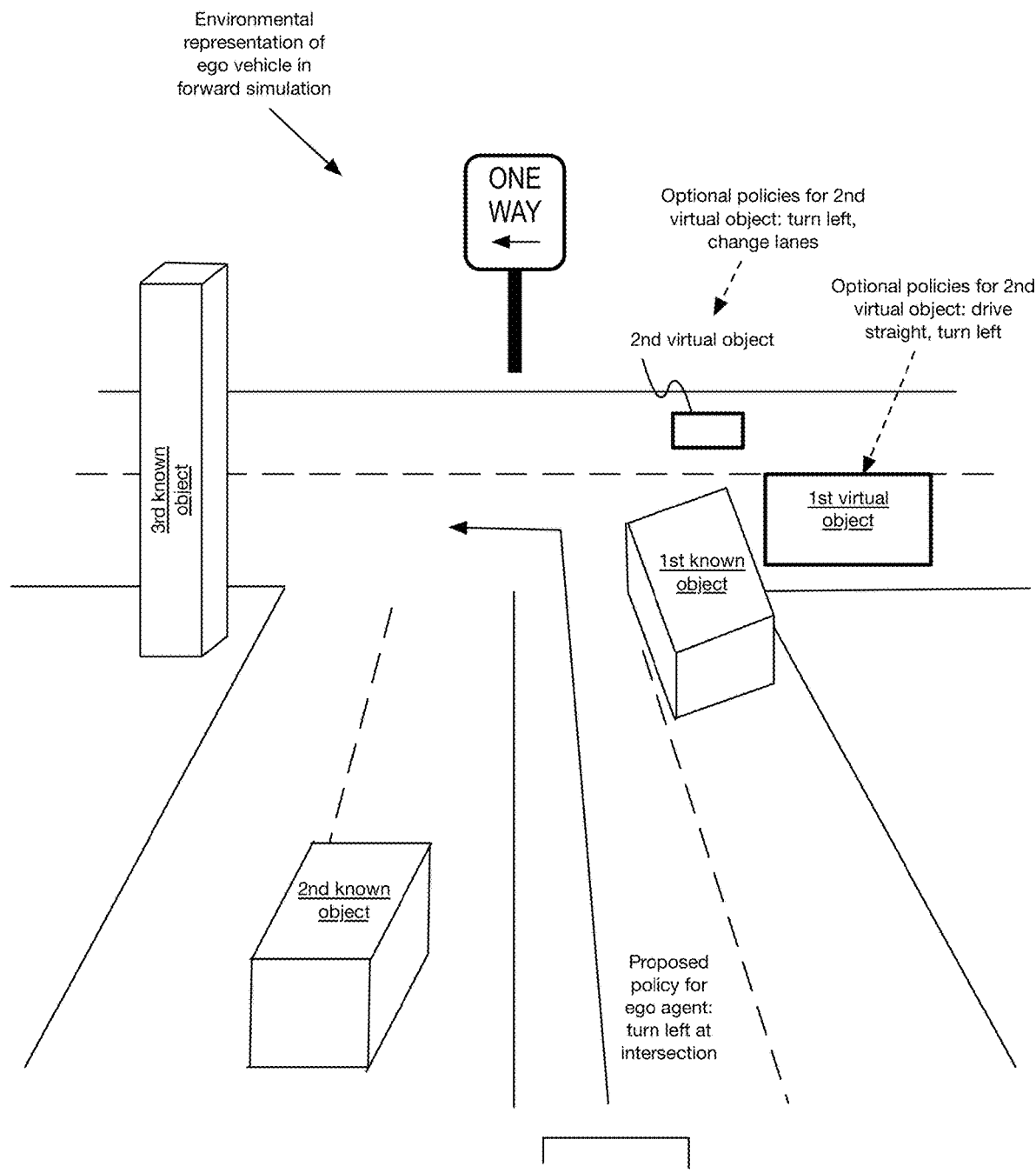

In a set of specific examples (e.g., as shown in FIG. 9E), each of the virtual objects is assigned a set of one or more policies to be used in simulating that virtual object. The policies preferably take into account features of the environment (e.g., which lane the virtual object is located in) and optionally the policy selected for the ego vehicle, such that the policies represent those which could cause an interaction with the ego vehicle (e.g., wherein the $2^{nd}$ virtual object is not simulated with a "drive straight" policy as this would not lead to an interaction with the ego vehicle turning left; wherein the $1^{st}$ virtual object is not simulated with a "change lanes" policy as this would not lead to an interaction with the ego vehicle turning left; etc.). Additionally or alternatively, the virtual objects can be simulated with a single policy (e.g., most likely policy, policy most likely to lead to a collision, etc.); simulated without a policy; simulated with multiple locations and/or other parameters; otherwise simulated; and/or not simulated.

Any or all of the parameters and/or features can be determined with a database (e.g., lookup table, library, etc.). In specific examples, for instance, a library of different standard sizes (e.g., height, width, length, etc.) and/or parameters for different types of virtual objects (e.g., 4-wheeled vehicles, 2-wheeled vehicles, bikes, pedestrians, etc.) can be referenced when selecting the virtual object(s). Additionally or alternatively, the virtual objects can be otherwise determined.

In a first variation (e.g., as shown in FIGS. 3A-3B), a set of virtual vehicles and a pedestrian are selected for a set of blind regions associated with an agent approaching an intersection conflict zone.

Figure 4:
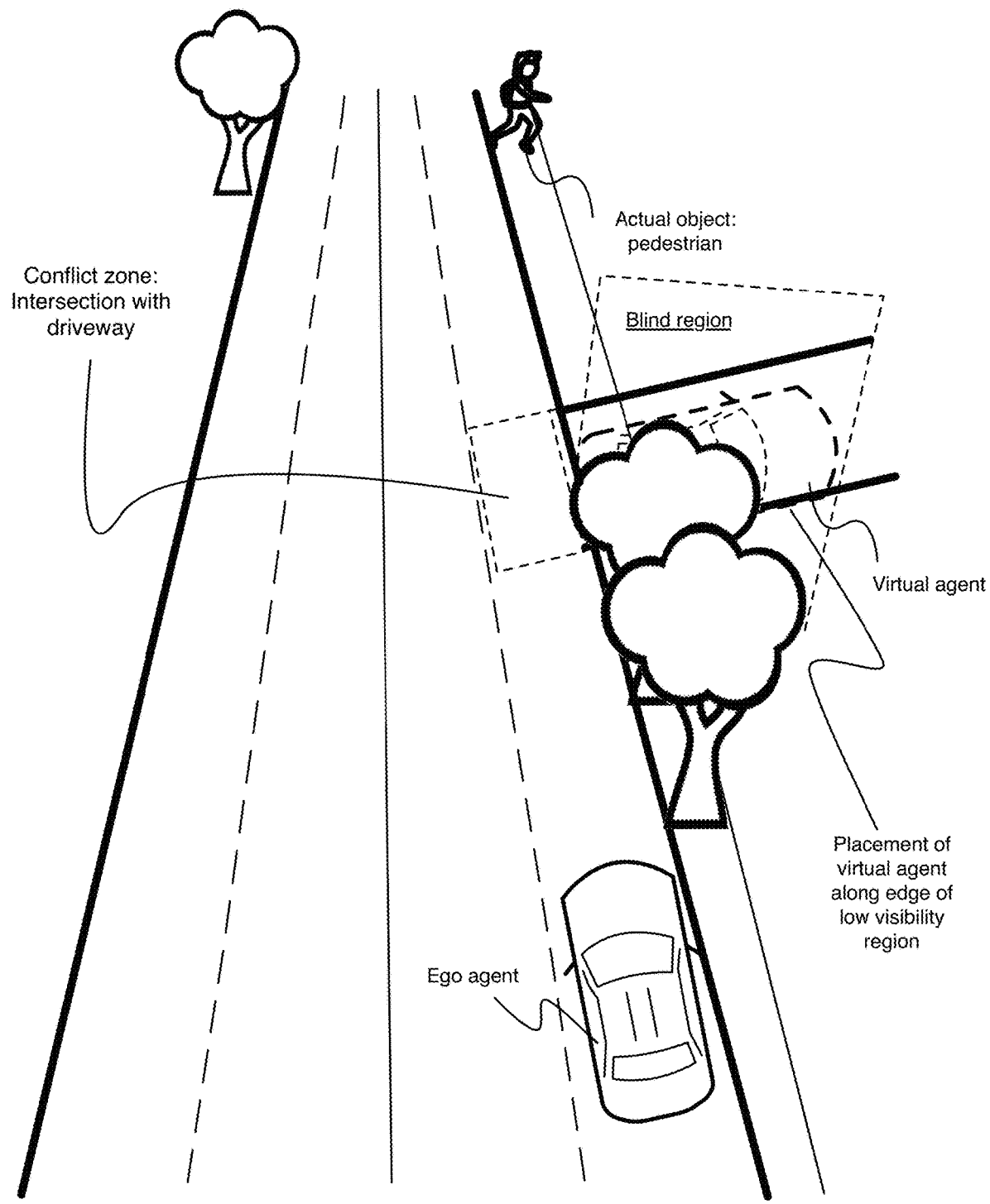
FIG. 4 depicts a schematic variation of operating an autonomous agent in a second conflict zone.

In a second variation (e.g., as shown in FIG. 4), a virtual vehicle arranged as close as possible to the ego agent is selected for a blind region associated with a conflict zone including a driveway intersecting with a roadway.

Additionally or alternatively, a set of virtual objects can be determined in absence of and/or independently of a blind region (e.g., to create additional traffic in an environment of the user, to create virtual objects in visible regions, etc.).

Further additionally or alternatively, S230 can include any other suitable processes and/or can be otherwise suitably performed.

4.5 Method—Inserting the Set of Virtual Objects into the Blind Region S240

The method 200 can include inserting the set of virtual objects and their parameters/features into the blind region S240, which functions to enable the ego agent to consider the set of virtual objects in decision making. Additionally or alternatively, S240 can perform any other suitable functions.

S240 is preferably performed in response to S230, but can additionally or alternatively be performed during S230, in absence of S230, and/or at any other suitable time(s).

S240 is preferably performed at a computing system of the system 100, such as at a planning module of the computing system, such that the computing system considers both virtual and real objects when planning a trajectory (e.g., selecting a policy, selecting a behavior, etc.) of the ego agent. In preferred variations, for instance, both virtual objects and real objects are taken into account in the determination and selection of a policy in a multi-policy decision making module (e.g., as described above) of the computing system. The virtual objects are preferably considered to be indistinguishable from the real objects, but can additionally or alternatively be otherwise considered (e.g., of lower priority, with contributions being weighted, according to their probability likelihoods, etc.) in the planning and/or other processes.

4.6 Method—Operating the Autonomous Agent Based on the Set of Virtual Objects S250

The method 200 can include operating the autonomous agent based on the set of virtual objects S250, which functions to maneuver the autonomous agent in its environment. Additionally or alternatively, S250 can function to optimally (e.g., most efficiently, in a way which is most natural to other road users, relative to progress toward a goal, etc.) maneuver the autonomous agent; and/or can perform any other suitable functions.

S250 is preferably performed in response to S240, but can additionally or alternatively be performed in response to another process of the method 200; in absence of S240; during S240 and/or another process of the method 200; multiple times; in response to a trigger; and/or at any other times.

The ego agent is preferably operated in accordance with a multiple policy decision making (MPDM) process, such as described above and/or in U.S. application Ser. No. 16/514,624, filed 17 Jul. 2019, and/or U.S. application Ser. No. 17/365,538, filed 1 Jul. 2021, each of which is incorporated herein in its entirety by this reference, but can additionally or alternatively be otherwise performed.

S250 can optionally additionally or alternatively include adding additional policies for the ego vehicle to consider, where the additional policies are preferably configured to enable the ego vehicle to collect extra information about the blind region (and/or cause it to disappear), such as by moving forward (e.g., creeping, yielding, etc.) to collect additional sensor data; waiting a brief period of time (e.g., to allow known objects causing the obstruction to pass, etc.); and/or otherwise operating. These can function, for instance, to prevent the ego vehicle from being stalled at a blind region for long periods of time.

Additionally or alternatively, S250 can be otherwise performed and/or include any other suitable processes, such as trajectory generation (e.g., from the inferred object type, road geometry, etc.), and/or any other processes.

5. Variations

In a first variation of the method, the method 200 includes: receiving a set of inputs from a sensor system onboard the ego agent and optionally any other sensor systems; determining a blind region of the autonomous agent based on the sensor inputs and optionally detecting that ego agent is within and/or approaching a conflict zone; selecting a set of virtual objects and associated features and/or parameters of the virtual objects; inserting the set of virtual objects into the blind region; and operating the autonomous agent based on the set of virtual objects.

In a first set of specific examples, detecting that the ego agent is within and/or approaching a conflict zone is performed with a set of predetermined, labeled maps.

In a second set of specific examples, detecting that the ego agent is within and/or approaching a conflict zone is performed dynamically with processing of the sensor data (e.g., with a set of computer vision processes).

Figure 7:
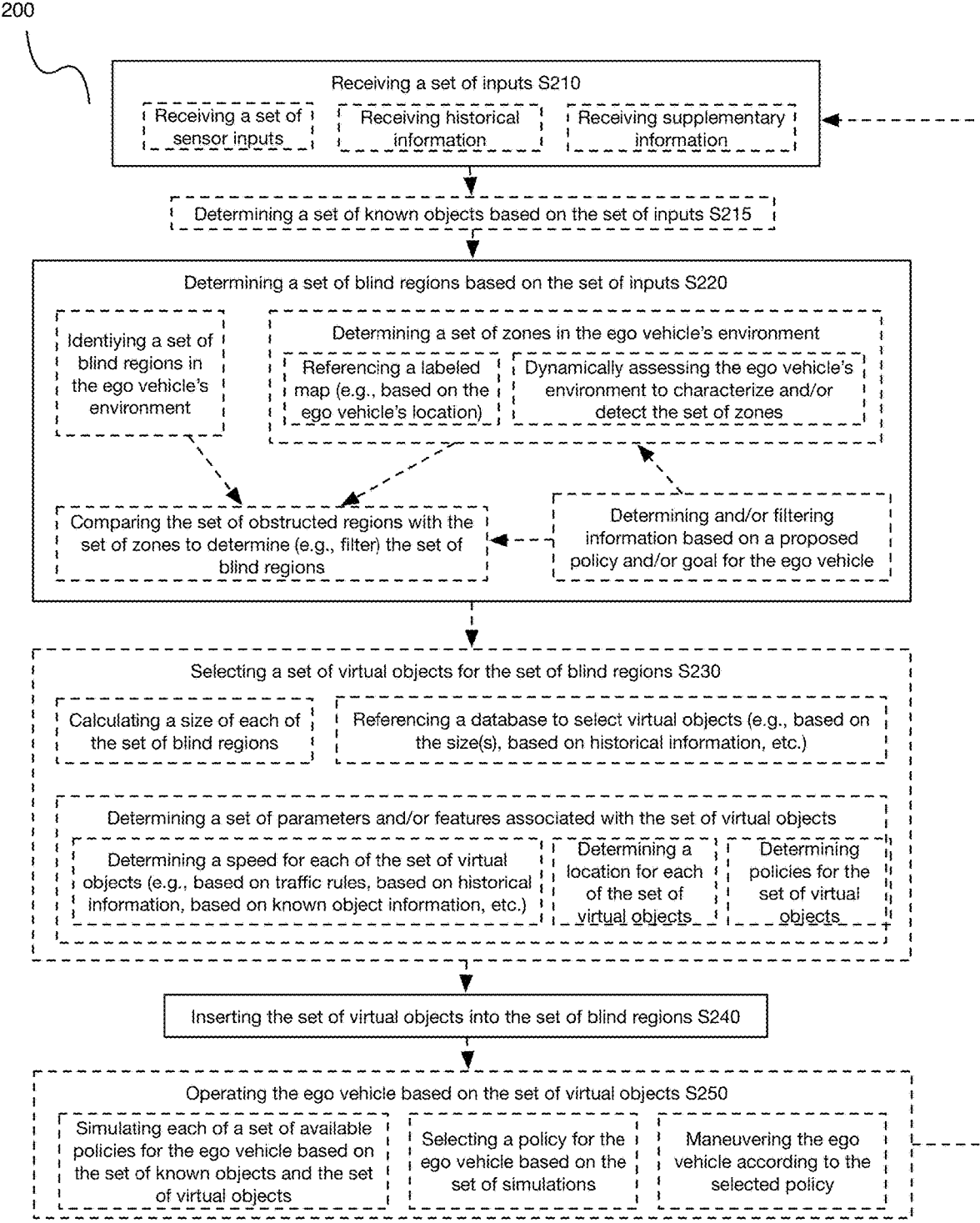
FIG. 7 depicts a schematic variation of a method for operating an autonomous agent.

In a second variation of the method (e.g., as shown in FIG. 7), the method 200 includes any or all of: receiving a set of inputs (e.g., sensor inputs, historical information, supplementary information, etc.); determining a set of known objects based on the set of inputs; determining a set of blind regions based on the set of inputs (e.g., identifying a set of blind regions in the ego vehicle's environment; determining a set of zones in the ego vehicle's environment; determining and/or filtering information based on a proposed policy and/or goal for the ego vehicle; comparing the set of obstructed regions with the set of zones to determine the set of blind regions; etc.); selecting a set of virtual objects and/or associated parameters associated with the set of virtual objects (e.g., calculating a size of each of the set of virtual objects; referencing a database to select virtual objects; determining a set of parameters and/or features associated with the set of virtual objects; determining a set of policies for the virtual objects; etc.); inserting the set of virtual objects into the set of blind regions; and operating the ego vehicle based on the set of virtual objects (e.g., simulating each of a set of available policies for the ego vehicle based on the set of known objects and the set of virtual objects; selecting a policy for the ego vehicle based on the set of simulations; maneuvering the ego vehicle according to the selected policy; etc.).

An example analysis performed in this variation is shown in FIGS. 9A-9E.

In a first set of specific examples, the set of inputs includes LiDAR data.

In a second set of specific examples, the set of inputs includes camera data.

Additionally or alternatively, the method 200 can include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for operating an autonomous vehicle with an incomplete environmental understanding, the method comprising:

collecting sensor data from a set of sensors onboard the autonomous vehicle;

characterizing an environment of the autonomous vehicle based on the sensor data, wherein the characterized environment comprises a set of known objects;

identifying a set of unknown regions in the characterized environment;

locating the set of unknown regions within a labeled map, wherein the labeled map comprises a set of labeled conflict zones;

identifying a subset of unknown regions from the set of unknown regions based on an overlap between the subset of unknown regions and the set of labeled conflict zones;

placing a virtual object from a set of virtual objects into each of the subset of unknown regions in the characterized environment;

performing a simulation based on the set known objects and the set of virtual objects; and operating the autonomous vehicle based on the simulation.

2. The method of claim 1, wherein the set of labeled conflict zones is determined at least in part based on a behavior associated with the autonomous vehicle.

3. The method of claim 2, wherein the behavior is a simulated behavior assigned to the autonomous vehicle in the simulation.

4. The method of claim 1, wherein the simulation is a forward simulation, and wherein the simulation is performed in accordance with a predetermined cycle frequency.

5. The method of claim 1, wherein operating the autonomous vehicle comprises selecting a behavior for the autonomous vehicle based on the simulation and maneuvering the autonomous vehicle according to the behavior.

6. The method of claim 1, further comprising selecting each of the set of virtual objects, wherein selecting each of the set of virtual objects comprises referencing a predetermined lookup table.

7. The method of claim 6, wherein the predetermined lookup table is referenced at least in part based on a size associated with each of the subset of unknown regions.

8. The method of claim 1, further comprising assigning a set of parameters to each of the set of virtual objects, wherein the set of parameters comprises a speed.

9. The method of claim 8, wherein the speed is determined based on information associated with the set of known objects.

10. The method of claim 9, wherein the information comprises a set of historical speeds associated with the set of known objects.

11. The method of claim 1, wherein determining the subset of unknown regions further comprises determining a probability associated with each of the subset of unknown regions and determining that each of the probabilities has exceeded a predetermined threshold.

12. The method of claim 11, wherein the probability is determined at least in part based on historical information.

13. The method of claim 12, wherein the historical information comprises at least one of: historical sensor data associated with a location corresponding to the unknown region of the subset and historical sensor data associated with a set of known objects in the characterized environment.

14. The method of claim 12, wherein the historical information is used to determine a change in a number of known objects in the characterized environment, wherein the probability is determined based on the change.

15. The method of claim 1, wherein the set of unknown regions is identified based at least in part on a set of height metrics associated with the characterized environment.

16. The method of claim 15, wherein each of the set of unknown regions has a height exceeding a predetermined height threshold relative to a ground level of the characterized environment.

17. The method of claim 1, wherein the sensor data comprises LiDAR data.

18. A method for operating an autonomous vehicle with an incomplete environmental understanding, the method comprising:

collecting sensor data from a set of sensors onboard the autonomous vehicle;

characterizing an environment of the autonomous vehicle based on the sensor data, wherein the characterized environment comprises a set of known objects;

identifying a set of unknown regions in the characterized environment;

determining a set of size parameters associated with each of the set of unknown regions;

locating the set of unknown regions within a labeled map, wherein the labeled map comprises a set of labeled conflict zones;

identifying a subset of unknown regions from the set of unknown regions based on an overlap between the subset of unknown regions and the set of labeled conflict zones;

selecting a virtual object from a set of virtual objects for each of the subset of unknown regions based on the set of size parameters;

placing the set of virtual objects into the subset of unknown regions in the characterized environment to form an updated characterized environment comprising the set of known objects and the set of virtual objects; and operating the autonomous vehicle based on the updated characterized environment.

19. The method of claim 18, further comprising assigning a first set of parameters to each of the set of virtual objects, wherein the first set of parameters is determined at least in part based on a second set of parameters associated with the set of known objects.

20. The method of claim 19, wherein each of the first and second sets of parameters comprises a speed.

* * * * *

UNITED STATES PATENT AND TRADEMARK OFFICE
CERTIFICATE OF CORRECTION

| | | |
|---|---|---|
| PATENT NO. | : 11,472,436 B1 | Page 1 of 1 |
| APPLICATION NO. | : 17/712757 | |
| DATED | : October 18, 2022 | |
| INVENTOR(S) | : Sajan Patel et al. | |

It is certified that error appears in the above-identified patent and that said Letters Patent is hereby corrected as shown below:

On the Title Page

Column 1, (73) Assignee, Line 1, Delete "Inc," and insert --Inc.,-- therefor

Signed and Sealed this
Twenty-first Day of March, 2023

*Katherine Kelly Vidal*

Katherine Kelly Vidal
*Director of the United States Patent and Trademark Office*